(12) United States Patent
Yoshida

(10) Patent No.: US 7,286,246 B2
(45) Date of Patent: Oct. 23, 2007

(54) METHOD AND APPARATUS FOR NON-CONTACT THREE-DIMENSIONAL SURFACE MEASUREMENT

(75) Inventor: Hiroyuki Yoshida, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 326 days.

(21) Appl. No.: 10/805,435

(22) Filed: Mar. 22, 2004

(65) Prior Publication Data
US 2004/0246496 A1 Dec. 9, 2004

(30) Foreign Application Priority Data
Mar. 31, 2003 (JP) .............................. 2003-096712

(51) Int. Cl.
*G01B 11/24* (2006.01)
*G06K 9/36* (2006.01)

(52) U.S. Cl. ...................... 356/605; 356/619; 356/604; 250/559.22; 382/286

(58) Field of Classification Search ........ 356/600–625; 250/237 G, 559.22; 382/286, 149, 141
See application file for complete search history.

(56) References Cited

U.S. PATENT DOCUMENTS

| | | | | |
|---|---|---|---|---|
| 4,657,394 A | * | 4/1987 | Halioua | 356/604 |
| 4,794,550 A | * | 12/1988 | Greivenkamp, Jr. | 702/167 |
| 4,839,524 A | * | 6/1989 | Grossman et al. | 250/505.1 |
| 5,175,601 A | | 12/1992 | Fitts | |
| 5,289,264 A | * | 2/1994 | Steinbichler | 356/605 |
| 5,307,151 A | * | 4/1994 | Hof et al. | 356/604 |
| 5,319,445 A | | 6/1994 | Fitts | |
| 5,502,466 A | * | 3/1996 | Kato et al. | 356/499 |
| 5,557,410 A | * | 9/1996 | Huber et al. | 356/604 |
| 5,577,991 A | * | 11/1996 | Akui et al. | 600/111 |
| 5,636,025 A | * | 6/1997 | Bieman et al. | 356/619 |
| 5,671,056 A | * | 9/1997 | Sato | 356/602 |
| 6,028,672 A | * | 2/2000 | Geng | 356/602 |
| 6,268,923 B1 | * | 7/2001 | Michniewicz et al. | 356/512 |
| 6,291,817 B1 | * | 9/2001 | Kobayashi et al. | 250/237 G |

(Continued)

FOREIGN PATENT DOCUMENTS

JP    A 10-246612    9/1998

(Continued)

OTHER PUBLICATIONS

Masahito Toonooka et al.; "Surface Profile Measurement by Phase and Contrast Detection using Grating Projection Method"; Precision Engineering Transaction of JSPE; vol. 66, No. 1; Jan. 2000; pp. 132-136.

(Continued)

*Primary Examiner*—Sang H. Nguyen
(74) *Attorney, Agent, or Firm*—Oliff & Berridge, PLC

(57) ABSTRACT

A non-contact three-dimensional surface measurement method is provided in which a grating pattern projected onto an object being measured, while the phase of the pattern is being shifted, is observed in a different direction from a projection direction to analyze the contrast of a grating image deformed in accordance with the shape of the object and thereby obtain the shape thereof. The method enables measurement of a three-dimensional shape over a large measurement range in a short time in a non-contact manner by successively shifting the focus on the projection and the imaging sides to enlarge the measurement range in the direction of depth.

8 Claims, 22 Drawing Sheets

U.S. PATENT DOCUMENTS 6,438,272 B1 * 8/2002 Huang et al. ............... 382/286
6,690,474 B1 * 2/2004 Shirley ....................... 356/603

FOREIGN PATENT DOCUMENTS

JP   A 2002-267429   9/2002

OTHER PUBLICATIONS

Juyang Wen et al.; "Camera Calibration with Distortion Models and Accuracy Evaluation"; IEEE Transactions on Pattern Analysis and Machine Intelligence; vol. 14, No. 10; Oct. 1992; pp. 965-980.

* cited by examiner

Projection moiré type

Shadow moiré type

Intensity waveform of a given pixel

Focused on the front

Focused on the middle

Focused on the rear

Fig. 28(a)
Full scale
Fig. 28 (b)
Expressed at 200mm intervals
in the direction of depth
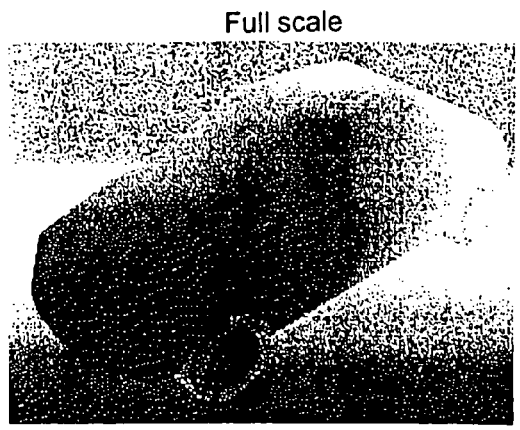
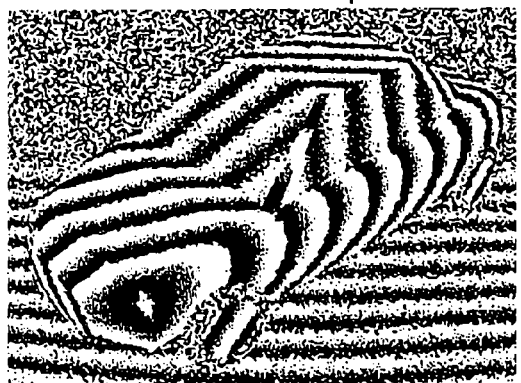
Front ←→ Rear
Fig. 29
Fig. 30
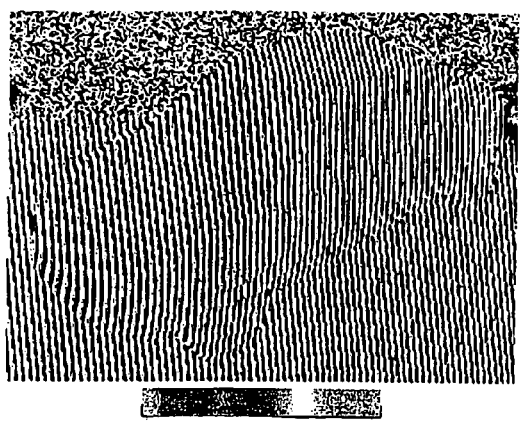
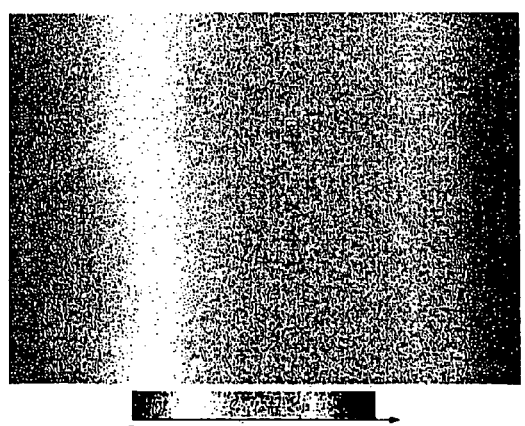
$-\pi$ 0 $\pi$
0 Absolute phase
Fig. 31(a)
Full scale
Fig. 31(b)
Expressed at 200mm intervals
in the direction of depth
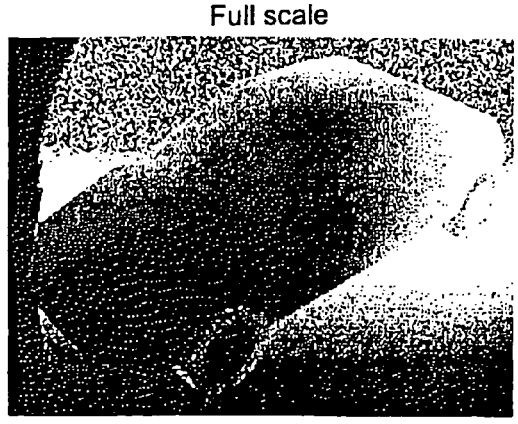
Front ←→ Rear

METHOD AND APPARATUS FOR NON-CONTACT THREE-DIMENSIONAL SURFACE MEASUREMENT

BACKGROUND OF THE INVENTION

1. Field of the Invention

The present invention relates to a method and an apparatus for non-contact three-dimensional surface measurement, which projects a grating pattern onto an object being measured while the phase of the pattern is being shifted, so that the projected pattern is observed in a different direction from that of the projection to analyze the contrast of a grating image deformed in accordance with the shape of the object and thereby obtain the shape thereof. More particularly, the invention relates to a method and apparatus for non-contact three-dimensional surface measurement which is preferably used for providing digitized data on design features to a CAD system as well as for a non-contact digitizer for evaluating the accuracy in shape of prototype or mass-produced parts (in the field of Reverse Engineering), which enables measurement of three-dimensional shapes such as of a full-scale car over a large measurement range at high speeds in a non-contact manner.

2. Description of the Related Art

For example, techniques for high-speed non-contact measurement of three-dimensional shapes are disclosed in Japanese Patent Laid-Open Publication No. Hei 10-246612 (Patent Document 1), U.S. Pat. No. 5,175,601 (Patent Document 2), and U.S. Pat. No. 5,319,445 (Patent Document 3). These documents describe moiré methods employing the moiré topography, in which a grating pattern is projected onto an object being measured to measure the three-dimensional shape of the object from a grating image deformed in accordance with the height distribution of each portion of the object. These moiré methods are divided into two types: the projection moiré and the shadow moiré. As shown in FIG. 1, the projection moiré method employs an optical configuration in which with two gratings G1, G2 for respective projection and observation uses being disposed each before a projection lens L1 and an imaging lens L2, the grating G1 is projected onto an object being measured through the lens L1 so that the grating lines deformed in accordance with the shape of the object are focused on the other grating G2 through the lens L2, thereby producing moiré contour lines at predetermined distances h1, h2, h3 from a reference surface. On the other hand, as shown in FIG. 2, the shadow moiré employs an optical configuration in which with one large grating G being disposed on a reference surface, a point light source S at the projection lens L1, and an observing eye "e" at the imaging lens L2, the shadow of the grating G formed by the light source S is projected onto the object being measured to form the shadow of the grating G deformed in accordance with the shape of the object, so that the shadow is observed with the observing eye "e" through the grating G, thus allowing the moiré fringes produced by the grating G and the deformed grating shadow to be observed. In addition, Japanese Patent Laid-Open Publication No. 2002-267429 (Patent Document 4) describes that a phase shift method can be applied to the shadow moiré method.

Furthermore, a non-contact surface measurement method which combines the projection of a grating pattern with a phase shift as shown in FIG. 3 is described in "Surface dimensional measurement using the grating pattern projection method by detecting phase and contrast" (Non-patent Document 1), by Masahito Tonooka et al, Precision Engineering Transaction of JSPE, Vol. 66, No. 1, pp 132-136 (January, 2000).

This method takes the following procedures to measure the shape of an object.

(1) For example, an illumination lamp 10 illuminates a grating filter 12 disposed before a projection lens 14, thereby allowing a grating pattern to be projected onto a work being measured 8 from a position different from the focal point of an imaging optical system (an imaging lens 20).

(2) A grating shift mechanism 16 moves (phase shifts) the grating filter 12 in the horizontal direction as shown by arrow "A", such that an image is captured by the pixels of an imaging device 22 via the imaging lens 20, thereby allowing the variations in intensity of the image at the pixels to be converted into sinusoidal waveforms.

(3) Several images are collected each at equal phase shift intervals.

(4) The phase and contrast at each pixel are calculated.

(5) The work 8 is moved stepwise in the direction of height (or in the direction of the focal point or the like) to repeat steps (2) through (4). The work 8 is moved at least twice.

(6) The focal point at which each pixel provides the maximum contrast is determined, and the fringe order is also determined.

(7) The phase at which each pixel provides the maximum contrast is selected to determine a phase distribution.

(8) The difference between the phase and a reference phase is calculated.

(9) The distance in the direction of depth (height) is calculated using the phase difference and the fringe order.

However, according to Patent Documents 1 to 4, the same output is repeatedly delivered each time the phase shifts by $2\pi$ as shown in FIG. 4. Accordingly, only the phase shift is not enough to identify the sequential number of a captured line of the projected grating, so that the order of the fringe cannot be determined. Therefore, the measurement range is limited to either one of A, B, C, D, . . . . A measurement range within the order of one fringe would cause the grating spacing to be widened, resulting in degradation in measurement accuracy. On the other hand, the grating spacing may be reduced to ensure high measurement accuracy; however, in this case, the measurement range is reduced in the direction of depth. Additionally, when compared with a pixel in focus, a pixel out of focus is measured with insufficient accuracy.

On the other hand, according to Non-patent Document 1, a less number of measurement steps would produce an error in fitting the Gaussian function to determine the maximum contrast, thereby causing a point to be located with reduced accuracy between steps. Moving times could be increased to reduce the error, but with an increase in measurement time. This would also make the system complicated because of the movements of the work or the illuminating and the imaging optical systems. Furthermore, the measurement range in the direction of depth can be increased by increasing the number of steps; however, constraints were placed on the measurement time and the system itself.

SUMMARY OF THE INVENTION

The present invention was developed to solve the aforementioned conventional problems. It is therefore an object of the invention to provide a simple configuration which can be reduced in size and provides an extended measurement range in the direction of depth to realize measurement with high accuracy across the entire measurement range.

The present invention provides a non-contact three-dimensional surface measurement method in which a grating pattern projected onto an object being measured, while a phase of the pattern is being shifted, is observed in a different direction from a projection direction to analyze contrast of a grating image deformed in accordance with a shape of the object and thereby obtain the shape thereof. To solve the aforementioned problems, the method is adapted such that the focuses of the projection and imaging sides are shifted successively to enlarge a measurement range in a direction of depth.

Furthermore, the present invention provides a non-contact three-dimensional surface measurement apparatus in which a grating pattern projected onto an object being measured, while a phase of the pattern is being shifted, is observed in a different direction from a projection direction to analyze contrast of a grating image deformed in accordance with a shape of the object and thereby obtain the shape thereof. To solve the aforementioned problems, the apparatus is adapted to include means for projecting a pattern onto the object being measured while the focus and the phase are being shifted, means for image data entry of the pattern projected onto the object while the focus is being shifted, and means for preparing a three-dimensional map by processing the image data entered.

Furthermore, the means for preparing a three-dimensional map may include means for determining an order of a fringe from a focal center and unwrapping the phase to calculate an absolute value of the phase, and means for calculating a three-dimensional position of a point of intersection of a grating plane of the fringe order and an epipolar line of an imaging point.

Furthermore, the apparatus may include means for correcting distortion of the projecting optical system and the imaging optical system.

Furthermore, the apparatus may be adapted to integrate the projecting optical system and the imaging optical system into a single shift mechanism, which is driven in a Z-axis direction.

The present invention combines focus shifts to enable determination of the order of a grating fringe and enlargement of a measurement range in the direction of depth while high accuracy is being maintained.

According to the present invention, the order of a fringe in a grating pattern is determined from a focal center, the phase is unwrapped, and the absolute value of the phase is determined in the direction of depth (Z), while the focus is successively shifted. This allows the measurement range to be significantly extended in the direction of depth while measurement is carried out with high accuracy. Additionally, since three-dimensional coordinates are calculated from a phase in which focus is achieved at each pixel, the coordinates can be determined when focus is achieved at all measurement points, thus enabling measurement with high accuracy in the X and Y directions.

BRIEF DESCRIPTION OF THE DRAWINGS

The above object, features and advantages of the present invention, as well as other objects and advantages thereof, will become more apparent from the description of the invention which follows, taken in conjunction with the accompanying drawings, wherein like reference characters designate the same or similar parts and wherein:

FIG. 28 is a view illustrating a focal center image in a step of preparing a three-dimensional map;

FIG. 29 is a view illustrating a phase image in a step of preparing a three-dimensional map;

FIG. 30 is a view illustrating an unwrap phase image in a step of preparing a three-dimensional map;

FIG. 31 is a view illustrating an example of a three-dimensional map image in a step of preparing a three-dimensional map;

BEST MODE OF THE INVENTION

Now, the present invention will be described below in more detail with reference to the accompanying drawings in accordance with the preferred embodiments.

Figure 5:
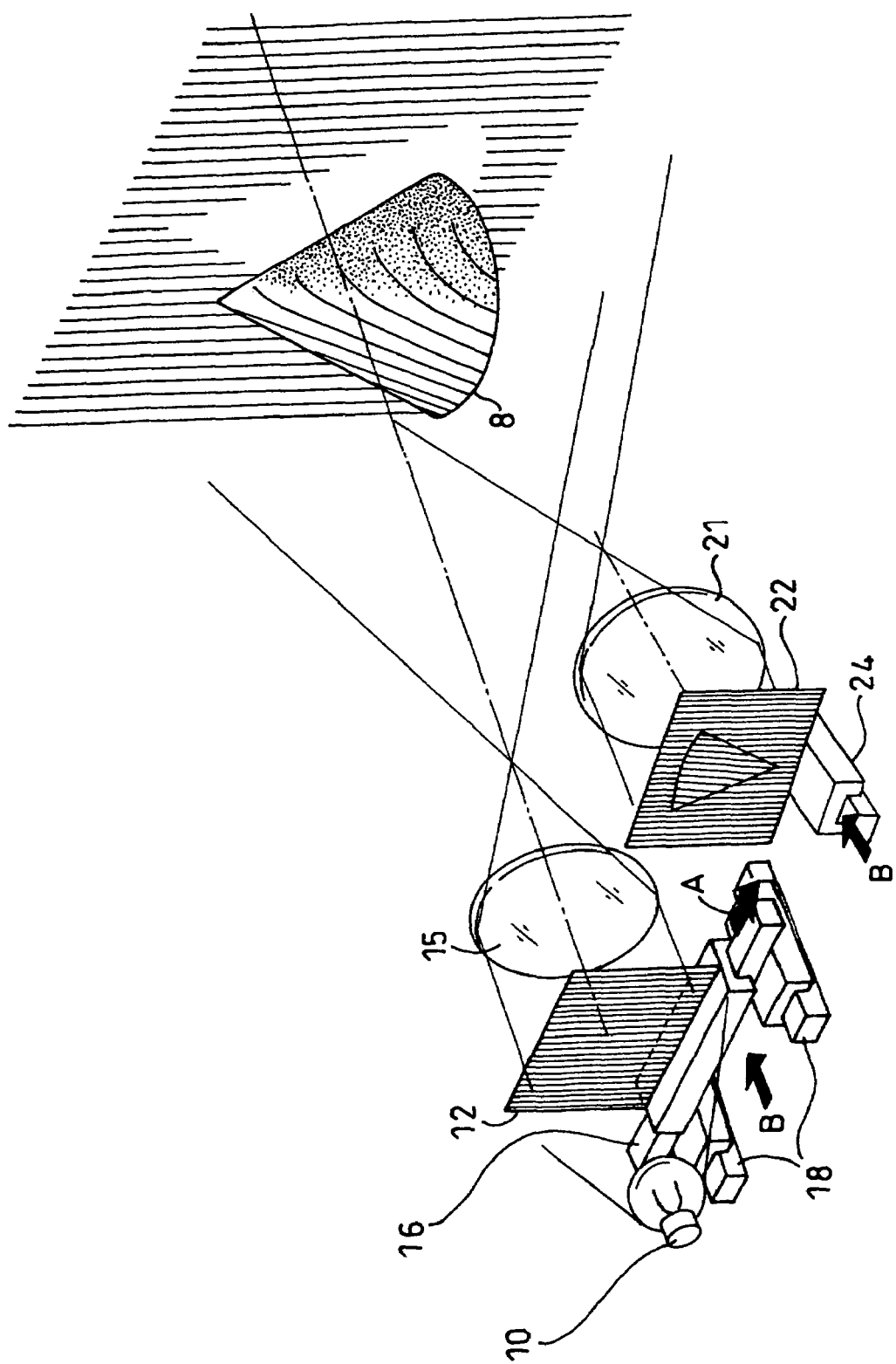
FIG. 5 is a perspective view illustrating the measurement principle of the present invention.

FIG. 5 illustrates the overall configuration of an apparatus for implementing the present invention.

Figure 1:
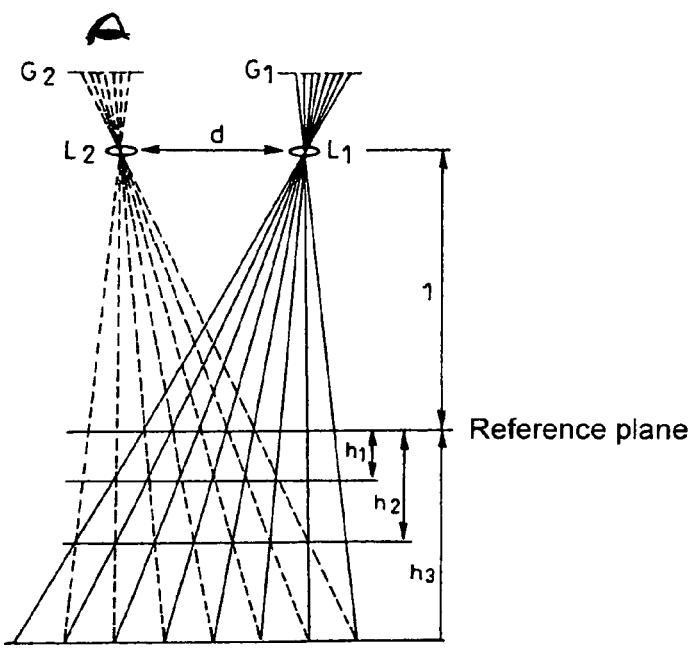
FIG. 1 is an optical path diagram illustrating the measurement principle of the conventional projection moiré method.
Figure 2:
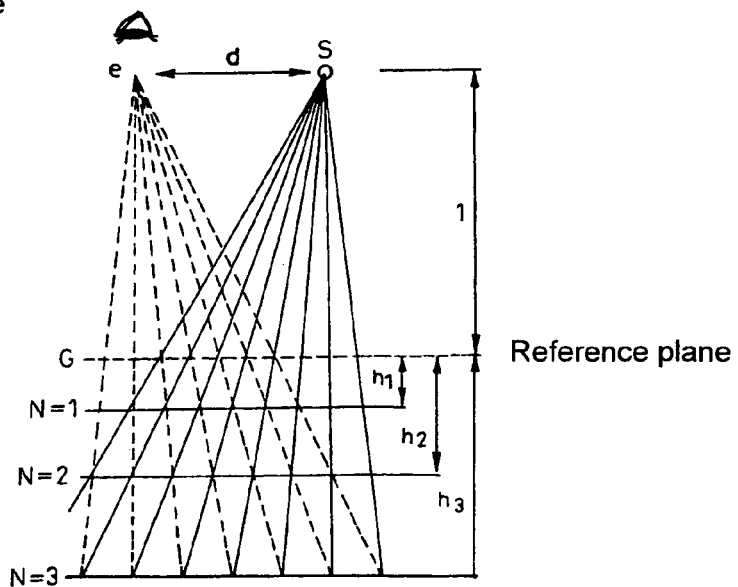
FIG. 2 is an optical path diagram illustrating the measurement principle of the conventional shadow moiré method.
Figure 3:
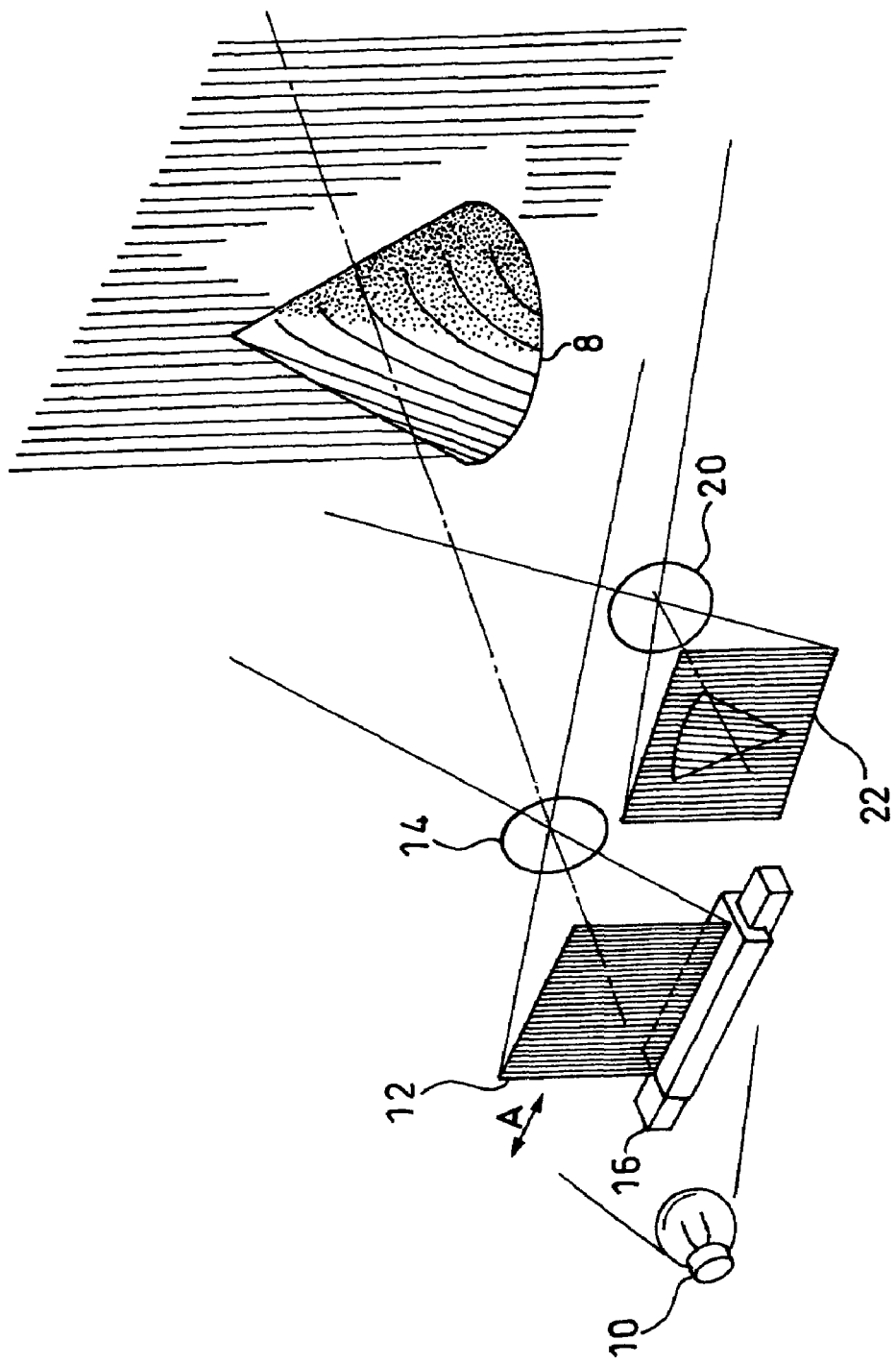
FIG. 3 is a perspective view illustrating the principle of the non-contact surface measurement method employing the conventional grating pattern projection plus phase shift.
Figure 4:
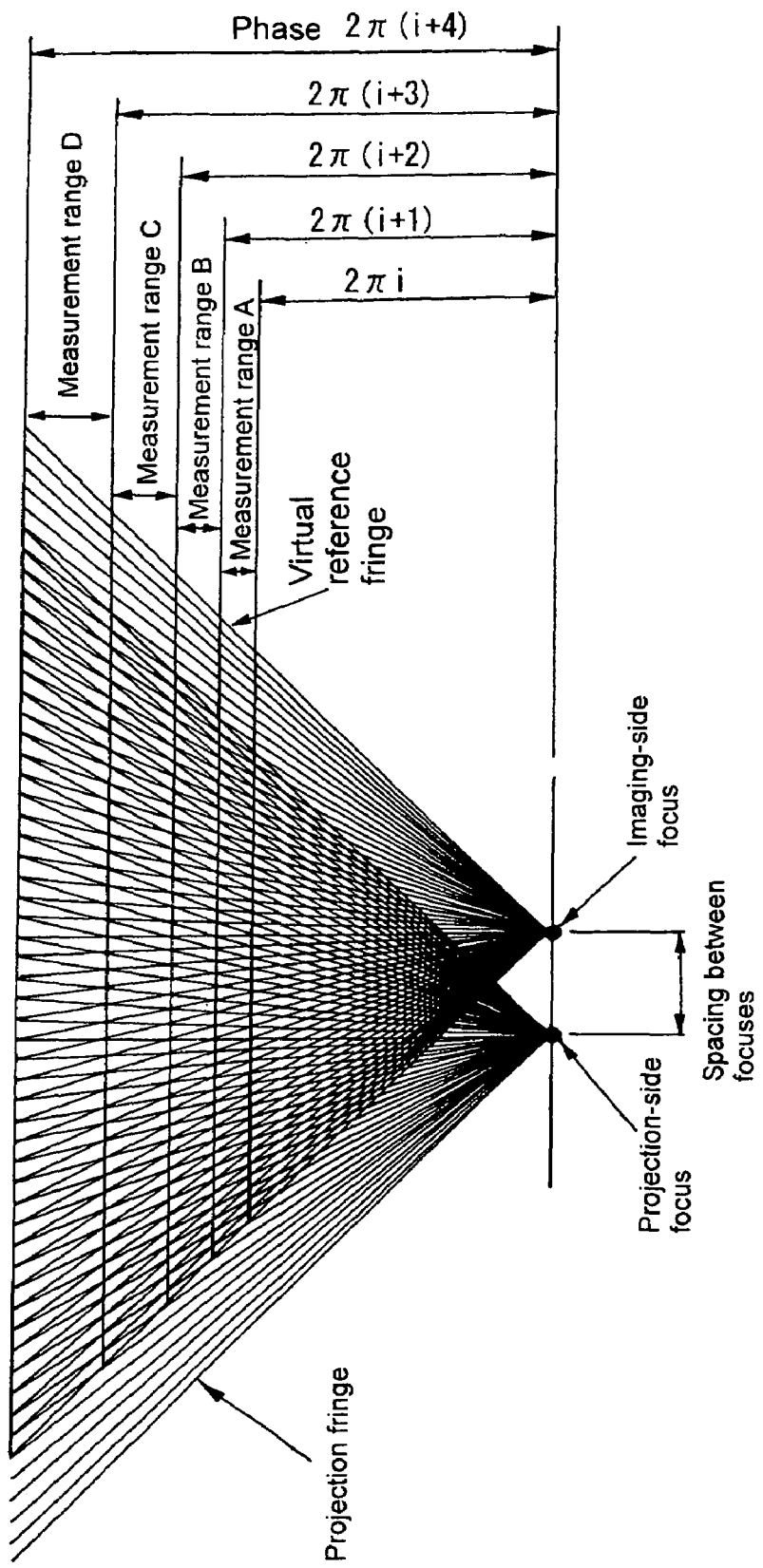
FIG. 4 is an optical path diagram of FIG. 3.

This embodiment relates to an apparatus similar to the conventional one shown in FIG. 3, in which further included are a first focus shift mechanism 18 for moving the grating filter 12 back and forth in the direction as shown by arrow "B" at a constant speed in conjunction with the grating shift mechanism 16 adapted to move the grating filter 12 in the horizontal direction as shown by arrow "A" at a constant speed, and a second focus shift mechanism 24 for moving the imaging device 22 such as a camera back and forth in the direction shown by arrow "B" at a constant speed. The apparatus according to this embodiment is provided with a projection lens 15 and an imaging lens 21 as an image side telecentric optical system to prevent an imaging point on the measured work 8 captured by a pixel from changing even when a focus shift occurs.

The first focus shift mechanism 18 for use with the grating filter 12 and the second focus shift mechanism 24 for use with the imaging device 22 are controlled to move in synchronization with each other.

The image collection timing of the imaging device 22 is determined corresponding to the amount of phase shift of the grating filter 12. The illumination lamp 10 is turned on in accordance with this image collection timing. For example, the illumination lamp 10 may be a xenon flash or halogen lamp for this purpose.

Figure 6:
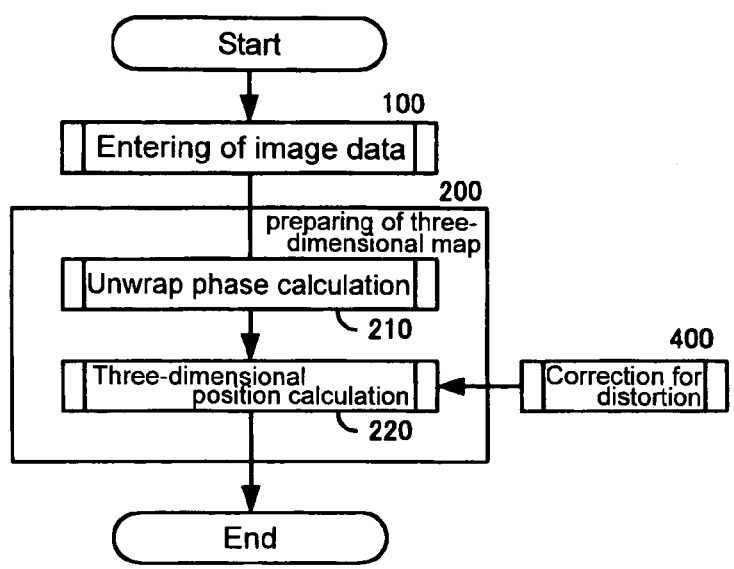
FIG. 6 is a flowchart illustrating the measurement procedure according to the present invention.
Figure 7:
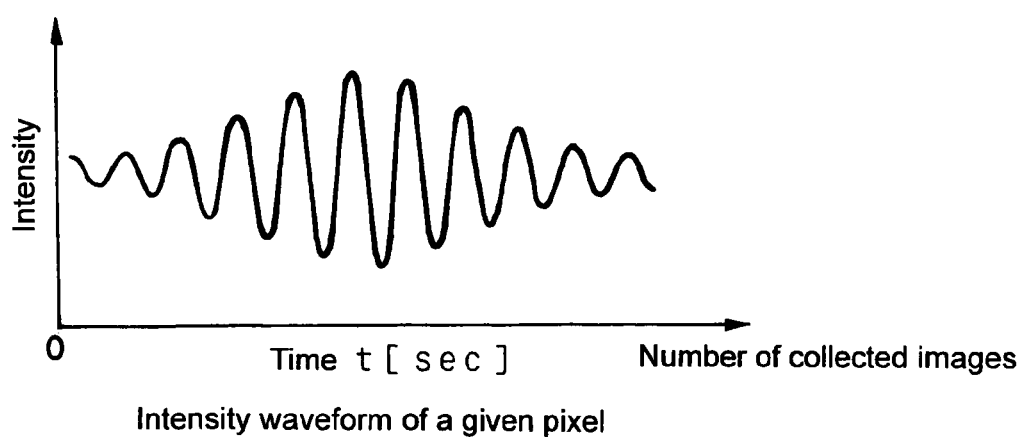
FIG. 7 is a time chart illustrating an example of a intensity waveform of a pixel according to the present invention.

The steps according to the present invention follow the procedures shown in FIG. 6. That is, first in step 100, the image data of the measured work 8 is entered successively while the focus and phase are shifted at a constant speed. FIG. 7 shows an example of a intensity waveform at a given pixel. For example, the duration of data entry is 4.3 seconds to collect 128 images with a camera (the imaging device 22) of 30 fps. Time t on the horizontal axis corresponds to the number of images to be collected.

Figure 8:
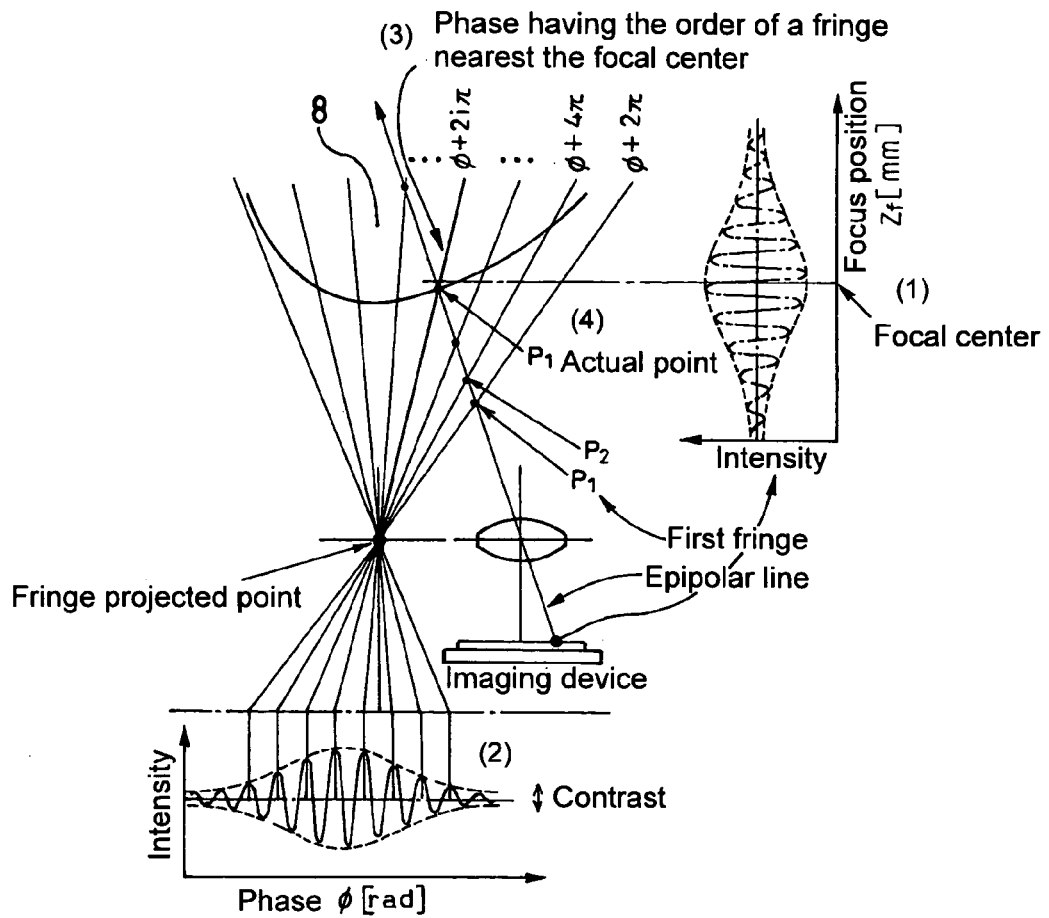
FIG. 8 is an optical path view illustrating the relation between the focus and the phase according to the present invention.
Figure 9:
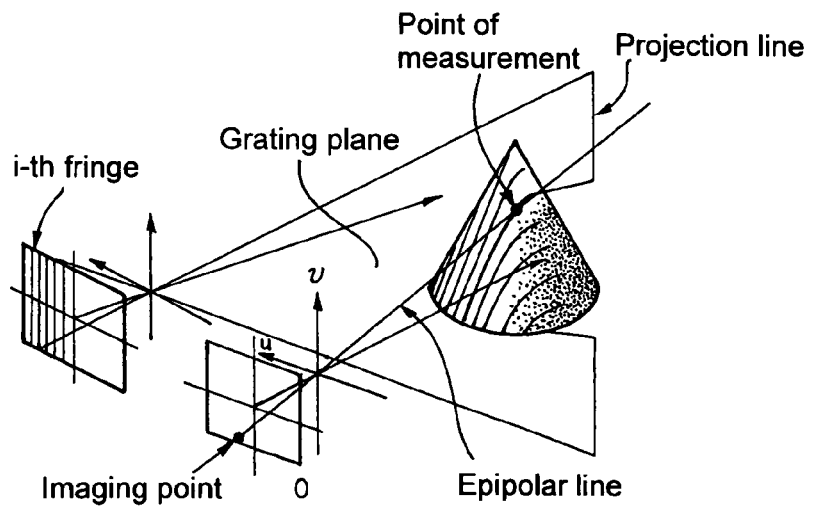
FIG. 9 is a perspective view illustrating the point of intersection of a grating plane and an epipolar line according to the present invention.

Then, the process proceeds to step 200, where the entered data is processed in a computer to prepare a three-dimensional map. That is, with the focal center associated with the phase as shown in FIG. 8, the order of a fringe is determined from the focal center in step 210 to change the phase from 0-2π to 0-nπ (referred to as unwrapping), thereby calculating the absolute value of the phase. As shown in FIG. 9, the grating plane of a fringe order and the epipolar line of an imaging plane are determined from the known parameters such as the location of the camera, the focal length, and the center of an image, and the absolute phase determined in step 210. Thus, in step 220, the three-dimensional position of their point of intersection is calculated as the three-dimensional position of an imaging point in the screen coordinates (u, v). This calculation is carried out across the entire image, thereby preparing a three-dimensional map.

Figure 10:
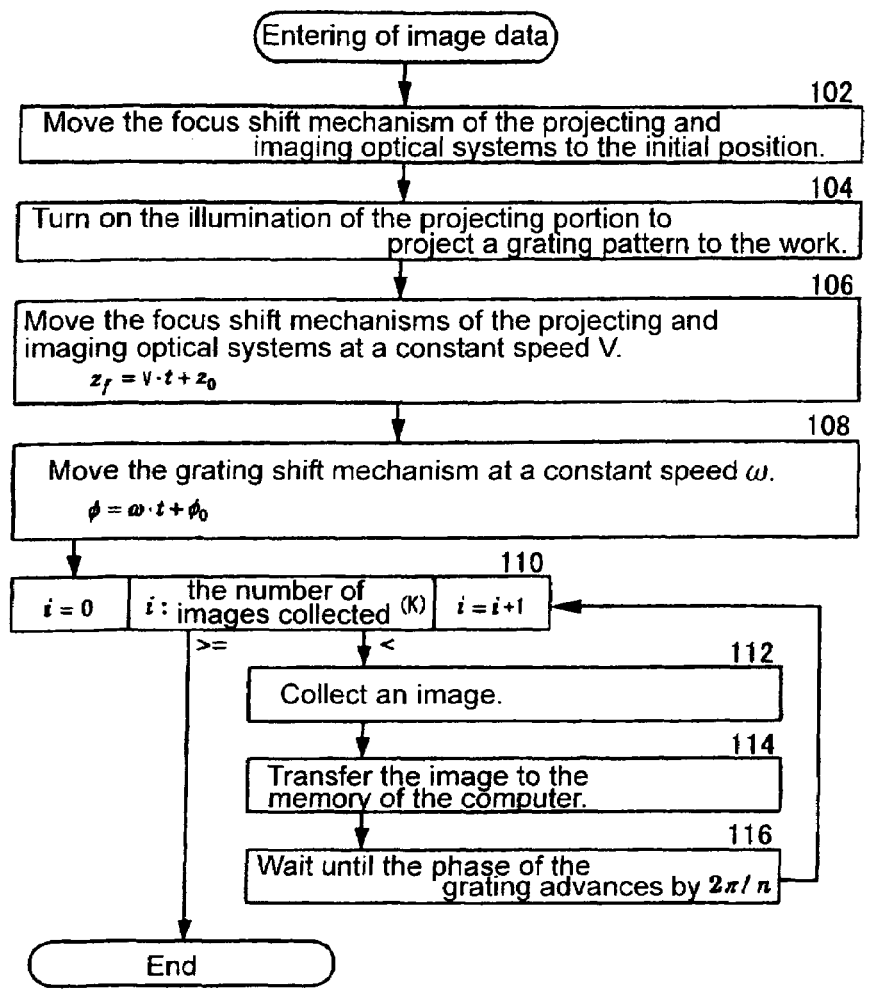
FIG. 10 is a flowchart illustrating the procedure for image data entry according to the present invention.

Image data is entered in step 100 as described above, more specifically, by following the procedures shown in FIG. 10. That is, first in step 102, the focus shift mechanisms 18, 24 of the projecting optical system and the imaging optical system are moved to an initial position.

Then, in step 104, the illumination lamp 10 is turned on to project the pattern of the grating filter 12 onto the measured work 8.

Then, in step 106, the focus shift mechanisms 18, 24 of the projecting optical system and the imaging optical system are moved at a constant speed V as expressed in the following equation.

$$z_f = V^* t + z_0 \qquad (1)$$

Then, the process proceeds to step 108, where the grating shift mechanism 16 is moved at a constant speed ω as expressed in the following equation.

$$\phi = \omega^* t + \phi_0 \qquad (2)$$

Then, the process proceeds to step 110, where it is determined whether the required number of collected images "K" has been reached. If the number of collected images "i" has reached "K", then the process exits the procedure.

On the other hand, if the number of collected images "i" is less than the required number of collected images "K", the process proceeds to step 112 to collect an image, transfer the image to the memory of the computer in step 114, and then wait in step 116 until the phase of the grating advances by a predetermined value of 2π/n.

Figure 11:
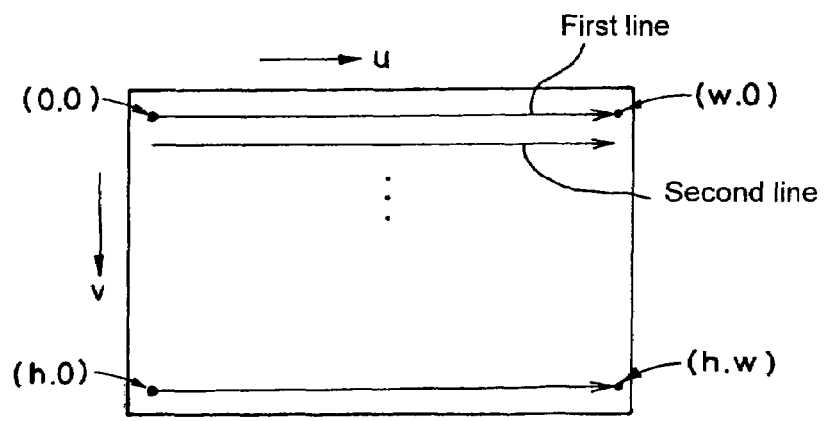
FIG. 11 is a view illustrating how to scan across pixels according to the present invention.

As shown in FIG. 11, to prepare a three-dimensional map in the aforementioned step 200, the three-dimensional position of an image is calculated for all the pixels with the upper left pixel being defined as (u, v)=(0, 0). First, in the first row of pixels from the leftmost to the rightmost, i.e., from u=0 to u=w with v=0, the intensity waveform is extracted and then the three-dimensional position ④ is calculated. Then, in the row of v=1, the aforementioned procedures are performed, which are then repeated in the same manner until the last row of v=h is reached.

Figure 12:
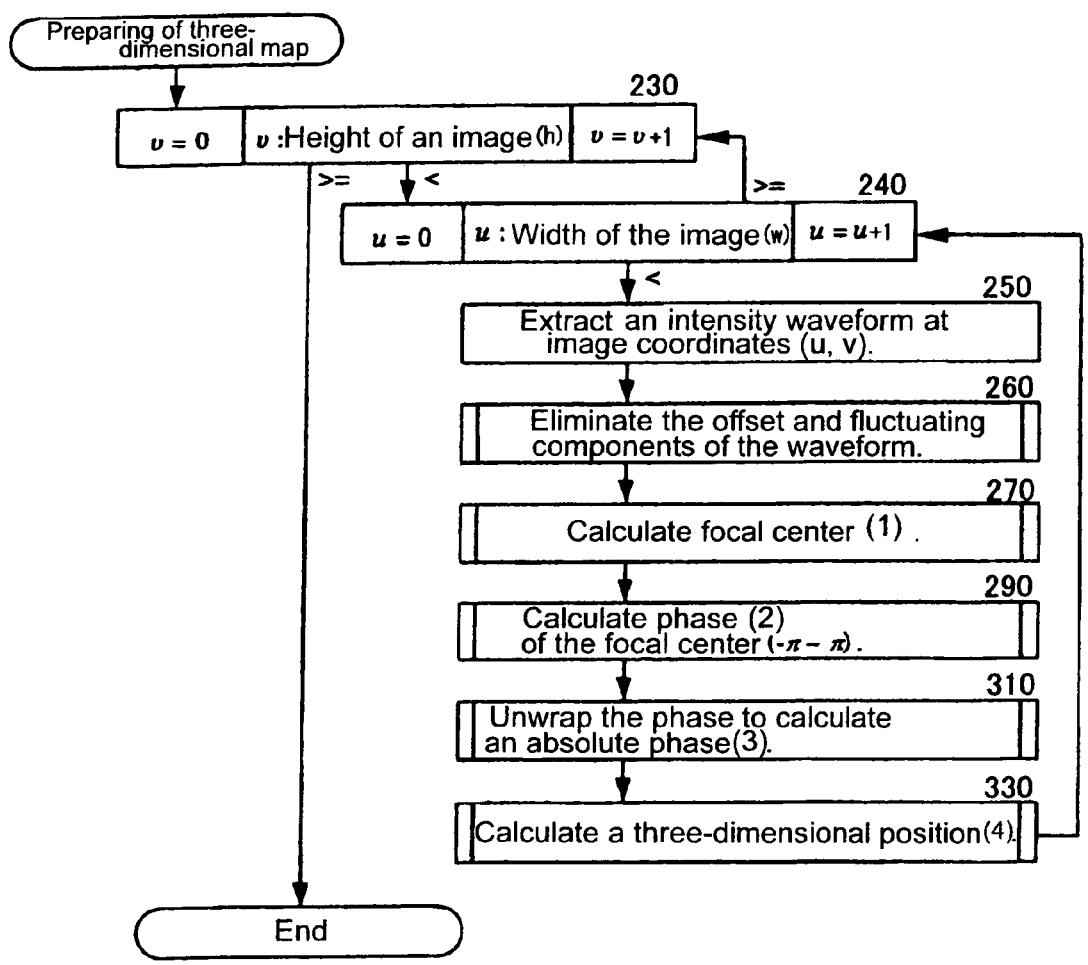
FIG. 12 is a flowchart illustrating the procedure for preparing a three-dimensional map according to the present invention.

More specifically, as shown in FIG. 12, the intensity waveform at image coordinates is extracted in step 250, and the process proceeds to step 260, where the offset and fluctuating components of the intensity waveform are eliminated. The offset and fluctuating components of the intensity waveform are eliminated in step 260 in order to eliminate the offset component of the intensity waveform as well as to eliminate the fluctuation in offset component caused by the incidence of reflected light from the vicinity of the work imaging point due to defocusing or by variations in surrounding environmental illumination. However, it is to be understood that the fluctuation varies sufficiently more gradually than the intensity varies due to phase shift.

Figure 13:
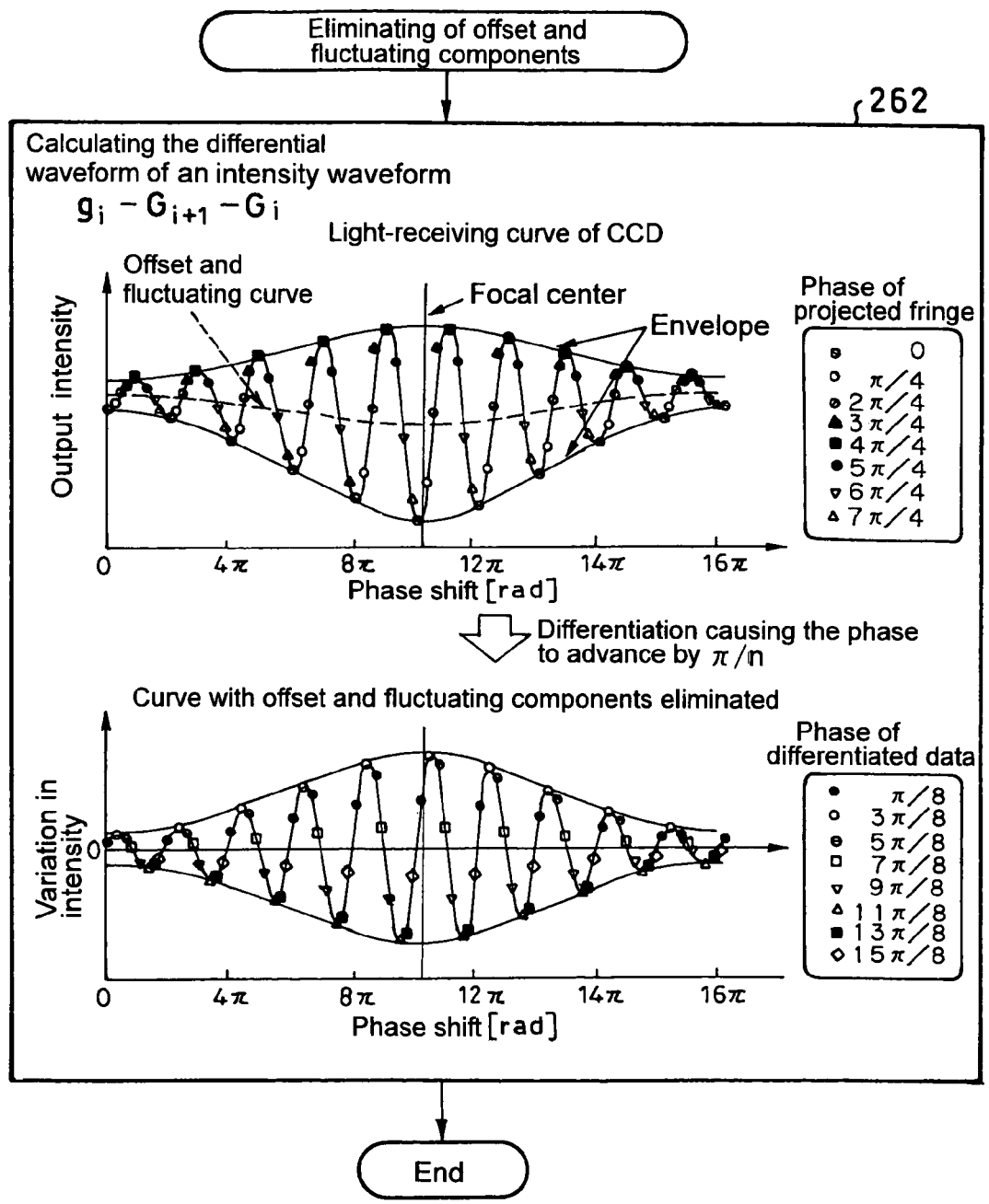
FIG. 13 is a flowchart illustrating one procedure for eliminating offset and fluctuating components according to the present invention.

More specifically, as shown in FIG. 13, the offset and fluctuating components can be eliminated by differentiating the intensity waveform in step 262. That is, the intensity waveform of the i-th collected image at the coordinates (u, v) can be expressed by the following equation.

$$Gi = A(i)\sin\{(2\pi i/n) + \phi\} + B + \epsilon(i) \qquad (3)$$

where $A(i)$ is the variation in amplitude of the waveform, $B$ is the offset component, and $\epsilon(i)$ is the fluctuating component. The differential waveform is expressed by the following equation, allowing the offset and fluctuating components to be eliminated.

$$g_i = A\cos\left\{\frac{(2i+1)\pi}{n} + \phi\right\} \quad (4)$$

$$\text{wherein, } \frac{\partial \varepsilon(i)}{\partial i} < 1$$

The differentiation of the discrete data causes an advance in the phase by π/n of the differentiated waveform.

Figure 14:
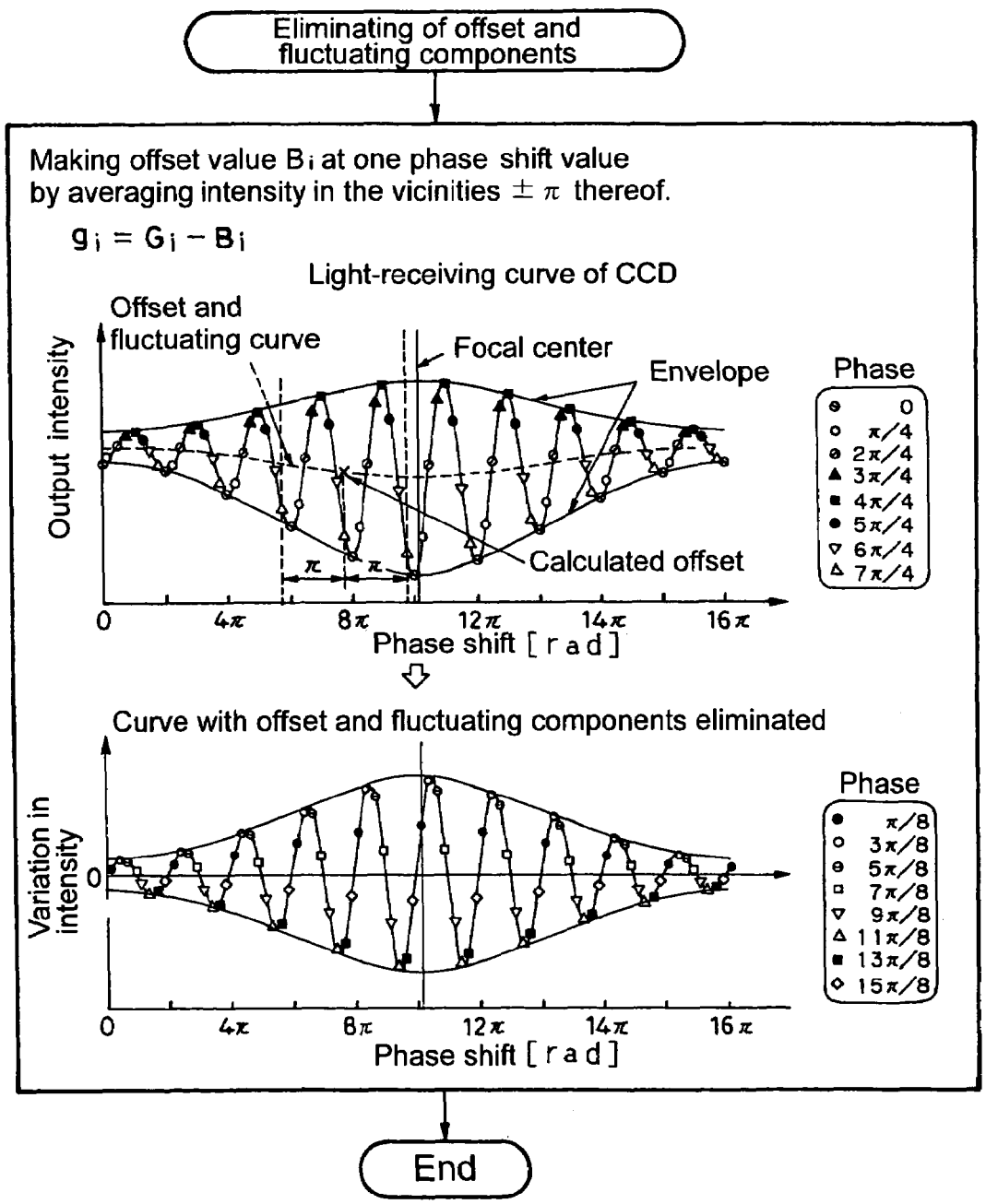
FIG. 14 is a flowchart illustrating the other procedure for eliminating offset and fluctuating components according to the present invention.

Further, the step 260 to eliminate the offset and fluctuating components of the intensity waveform may be conducted by step 264 as shown in FIG. 14. In the step 264, the offset value of the intensity waveform at one phase shift value is eliminated by averaging intensity in the vicinities ±π (back and forth) thereof.

More specifically, the intensity waveform at the coordinates (u, v) can be expressed by the above equation (3). Then, the offset component B+the fluctuating component ε(i) is expressed by the following equation (4a) and intensity waveform $g_i$ after eliminating the offset and fluctuating components is expressed by the following equation (4b).

$$B + \varepsilon(i) = \sum_{j=i-n}^{i+n-1} G_j \quad (4a)$$

$$g_i = G_i - \sum_{j=i-n}^{i+n-1} G_j \quad (4b)$$

In this case, elimination of the offset and fluctuating components from intensity waveform causes no phase shifting.

After the step 260 of FIG. 12 has been exited, the process proceeds to step 270, where the focal center ((1) in FIG. 8) is calculated. The focal center is calculated in step 270 in order to calculate the depth brought into focus in the Z-axis direction for determination of the order of a fringe. That is, suppose that a phase shift occurs at intervals of 2π/n (n is an integer) upon projecting the grating. In this case, variations in intensity for every n-th data form a focus contrast curve, providing the focal center at the peak of the contrast curve or the maximum intensity point. Therefore, the contrast curve can be regarded as a normal distribution curve to statistically determine the peak.

Figure 15:
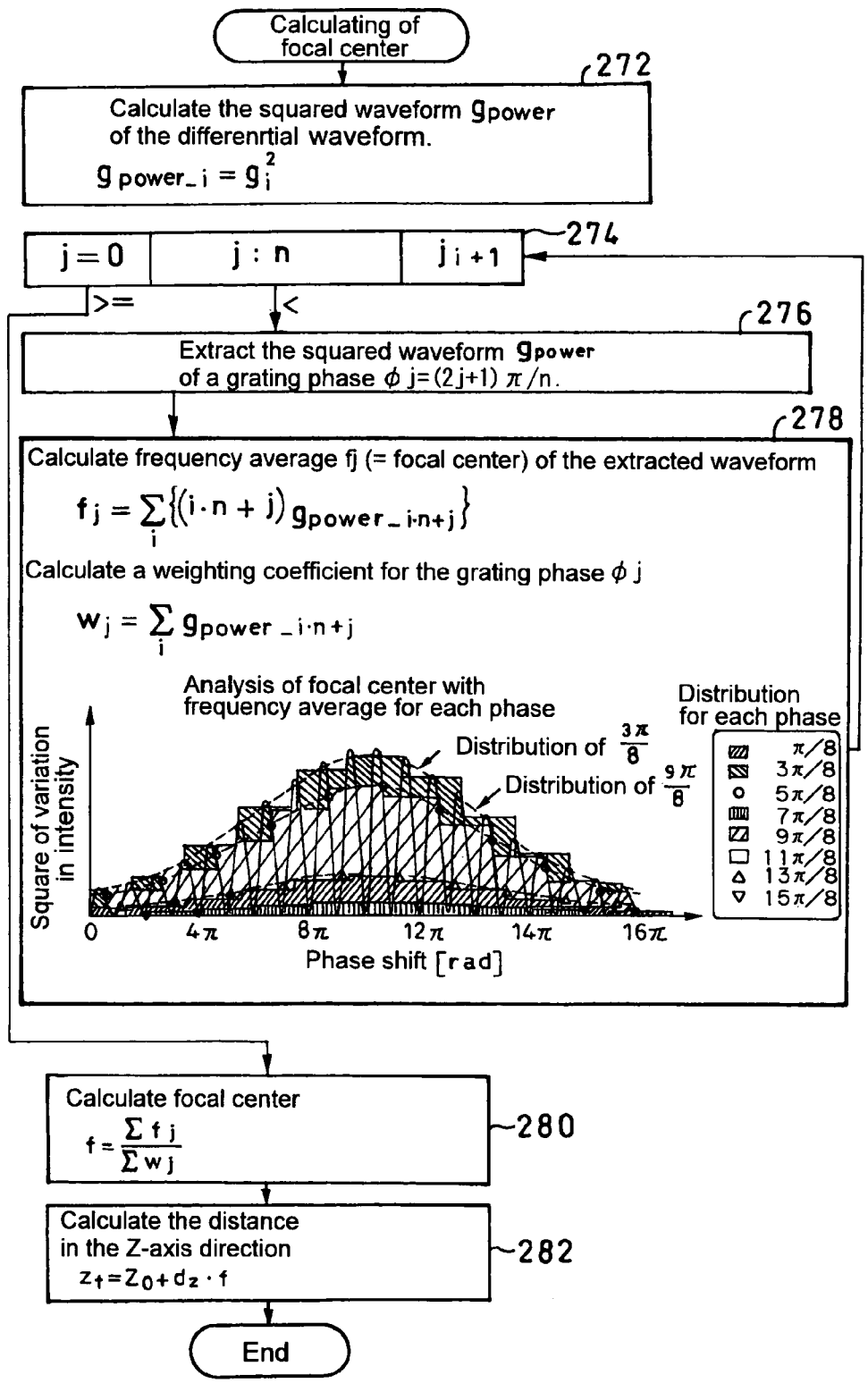
FIG. 15 is a flowchart illustrating the procedure for calculating the focal center according to the present invention.

FIG. 15 shows a specific procedure. In this procedure, for each of the squared waveforms of the curves indicative of every n-th variations in intensity ("j" extracted waveforms), a frequency average is determined being weighted correspondingly to the height of the crest of an extracted waveform (by area).

After step 270 of FIG. 12, the process proceeds to step 290, where the phase of the focal center ((2) in FIG. 8) is calculated (−π to π). The phase is calculated in step 290 to determine the phase of the fringes provided by projecting the grating pattern. Here, the waveforms apart from the focal point are mixed with reflected light from the vicinity of the imaging point. Thus, the data closer to the focal center can be more heavily weighted to determine the phase of the waveforms.

Figure 16:
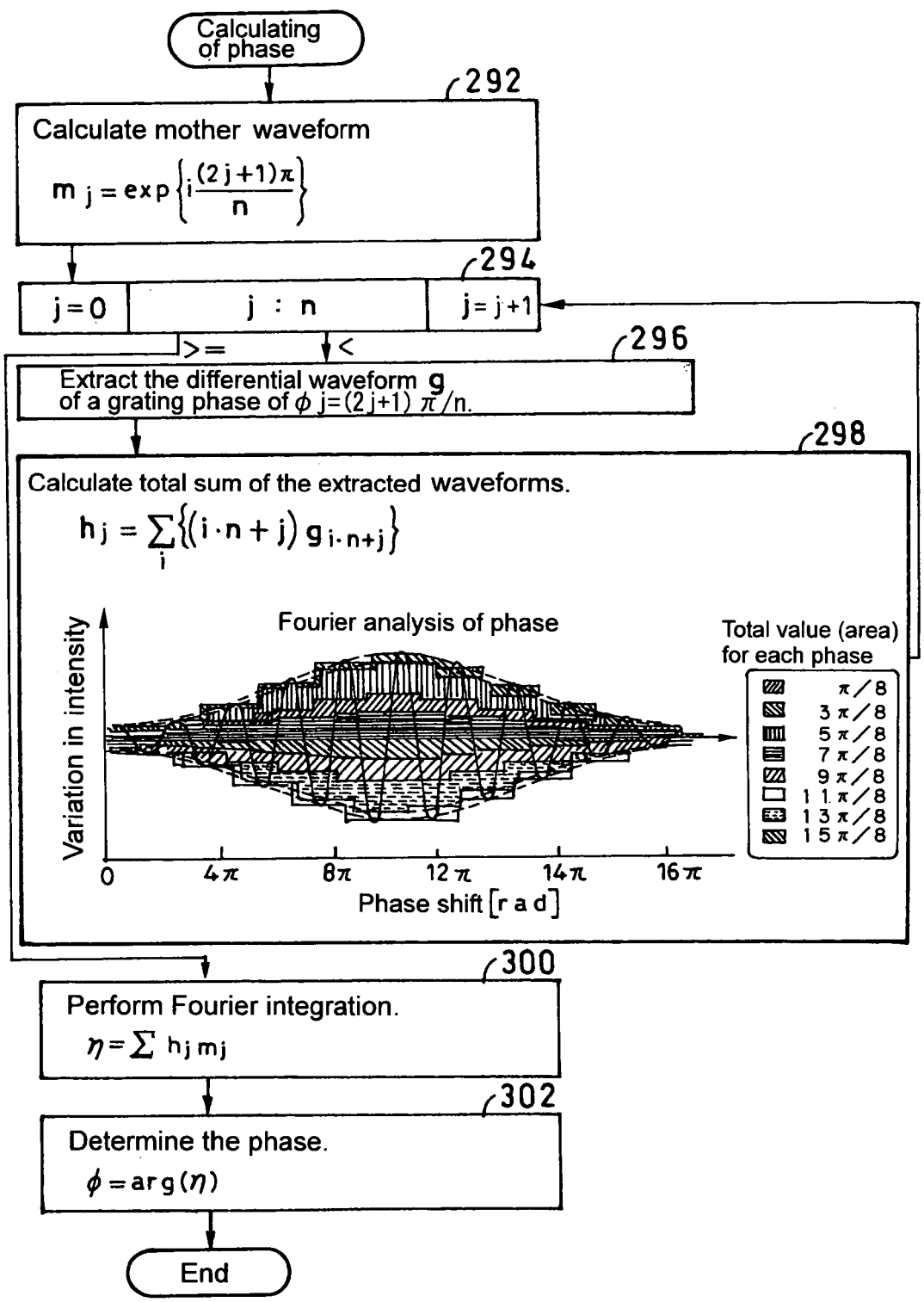
FIG. 16 is a flowchart illustrating the procedure for calculating the phase according to the present invention.
Figure 17:
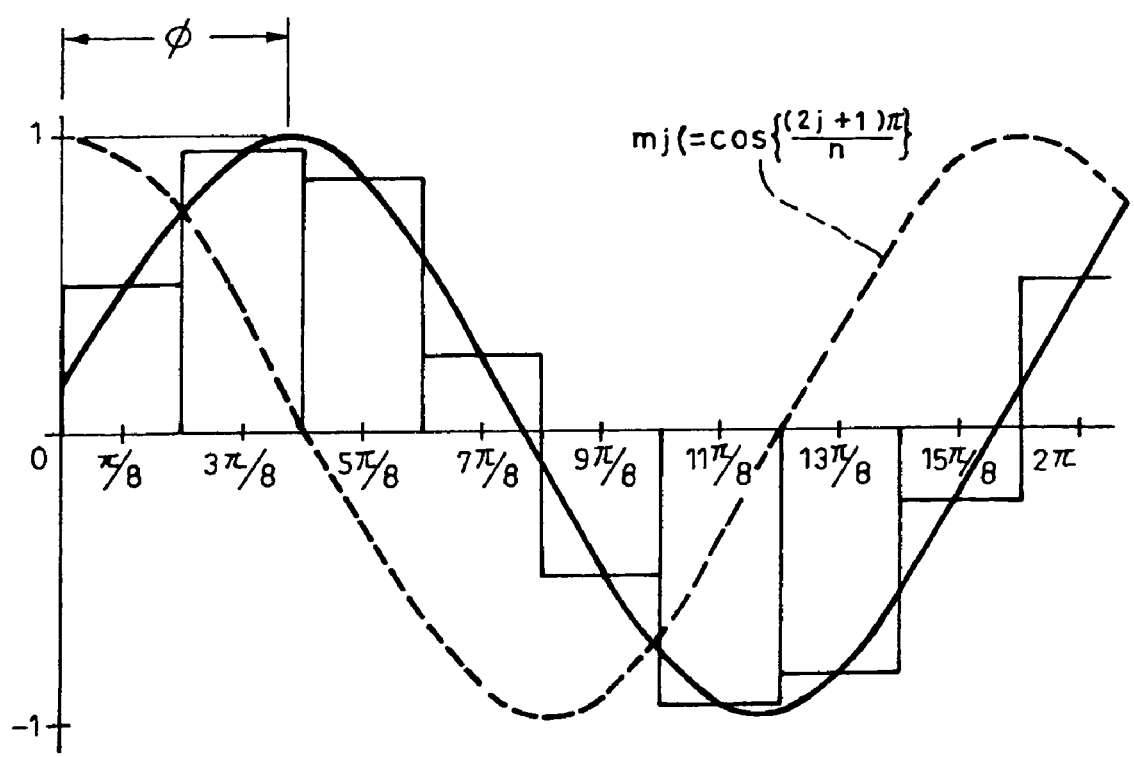
FIG. 17 is a detailed view of FIG. 15.

That is, assuming that the grating pattern is projected at phase shift intervals of 2π/n (n is an integer), the differential waveform values at every n-th data follow a normal distribution curve, indicating a contrast curve of focusing at phase 2πi/n (i=0, 1, . . . , n−1). Additionally, the contrast curve at each phase is proportional to the height of the crest of the focal center. Furthermore, the area surrounded by the contrast curve and the center line of the intensity values, (which is approximately equal to the total sum of the differential waveform values for every n-th data), is proportional to the height of the crest of the contrast curve. Thus, as shown by the specific procedure in FIG. 16, this is multiplied by the mother waveform mj determined in step 292, followed by Fourier integration in step 300, to determine the phase. That is, there are contrast curves of eight phases at every π/4 from π/8 to (15π)/8. The area surrounded by each of the curves and the center line of the intensity values is determined to find a sinusoidal waveform that is formed by the area of each phase interval as shown in FIG. 17 (Fourier Integration). Then, the phase difference between the mother waveform and the sinusoidal waveform is determined as φ. This is done for all the pixels (u, v).

Figure 18:
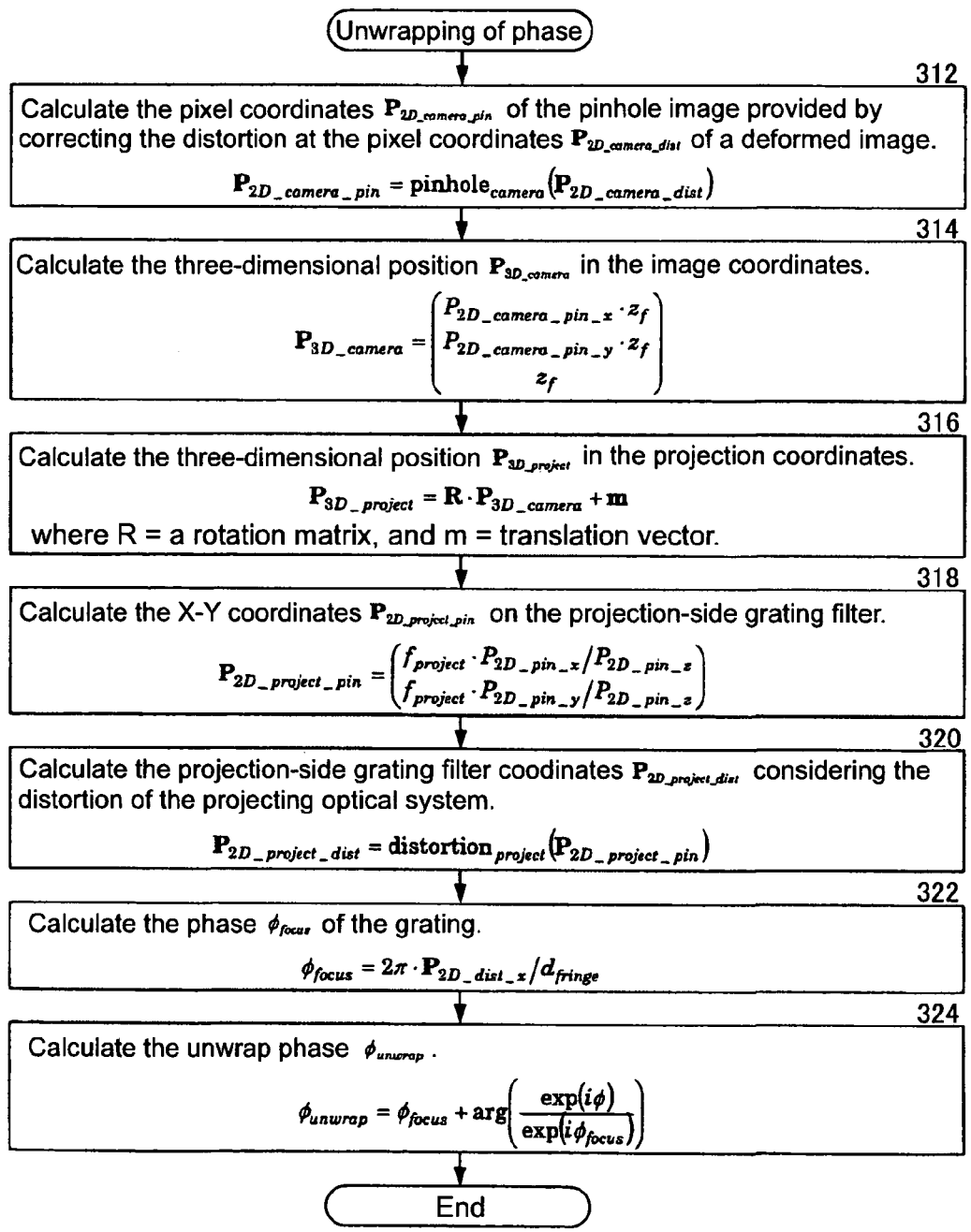
FIG. 18 is a flowchart illustrating the procedure for unwrapping the phase according to the present invention.

After the step 290 of FIG. 12 has been exited, the process proceeds to step 310, where the phase is unwrapped to calculate the absolute phase ((3) in FIG. 8) as the phase having the order of a fringe closest to the focal center. The phase is unwrapped in step 310 in order to determine the closest fringe to the focal center for calculation of the absolute phase. The specific procedure is shown in FIG. 18. That is, with (2) in FIG. 8, it is found with which fringe order in the grating the fringe is associated counting from the leftmost. Therefore, the φ focus of step 322 takes an approximate unwrap value (a value close to the unwrap phase). Furthermore, in the equation in step 324, the exp(iφ) is an accurate phase between −π to +π. For the second term on the right hand side, an angle (a fractional angle of φ−φ focus) is determined to find an accurate phase in accordance with φ unwrap=(2π×order)+φ because

φ focus=(2π×order)+a fractional angle of φ focus.

Figure 19:
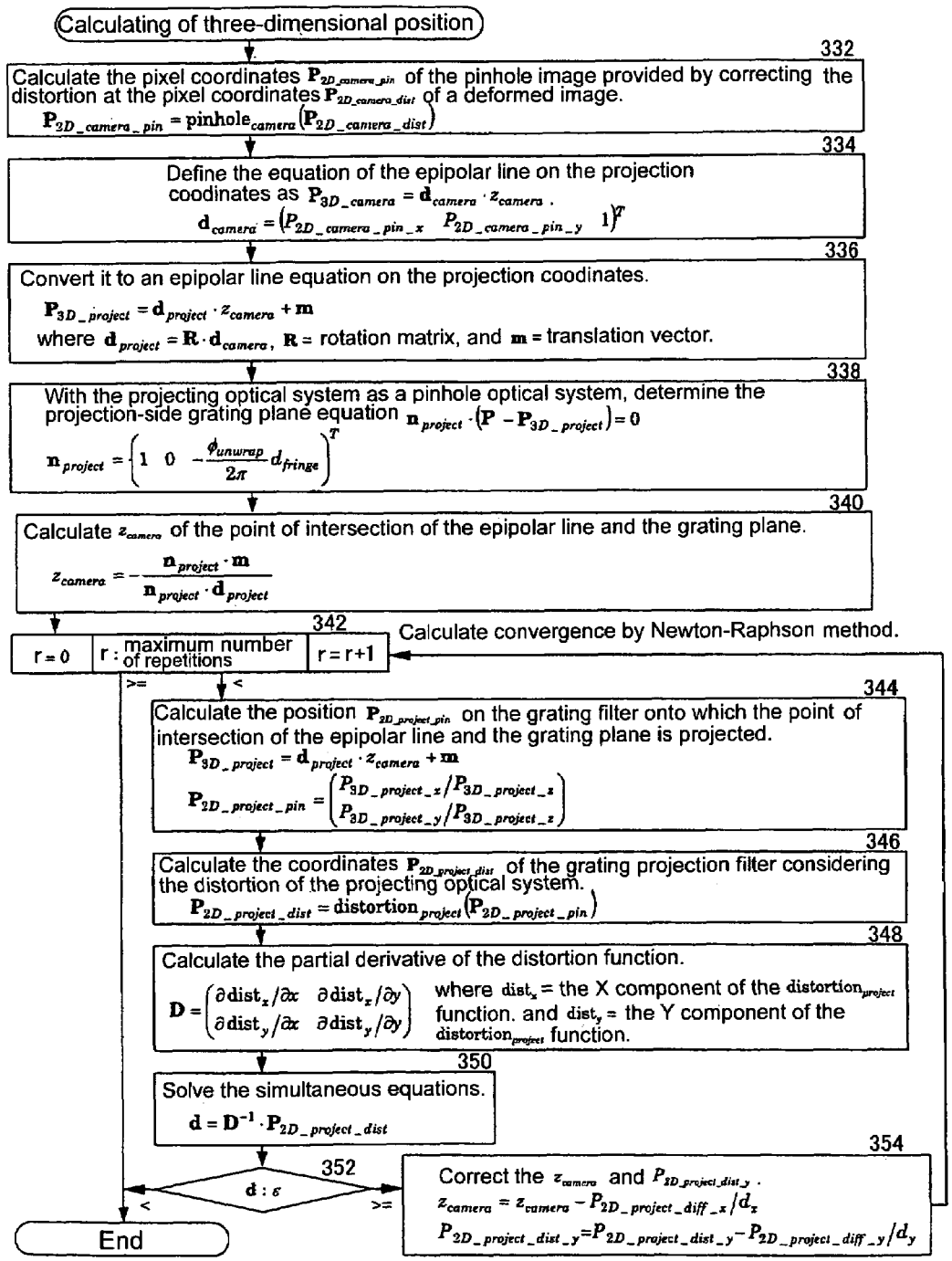
FIG. 19 is a flowchart illustrating the procedure for calculating a three-dimensional position according to the present invention.

After the step 310 of FIG. 12 has been exited, the process proceeds to step 330, where the three-dimensional position of an actual point Pi ((4) in FIG. 8) is calculated, and then the process returns to step 240. The three-dimensional position is calculated in step 330 in order to calculate the three-dimensional position of a point whose image is being collected. A specific procedure is shown in FIG. 19.

To calculate the three-dimensional position in the step 220 of FIG. 6, the distortion of the measurement head is corrected in step 400, if necessary, to ensure higher accuracy.

Figure 20:
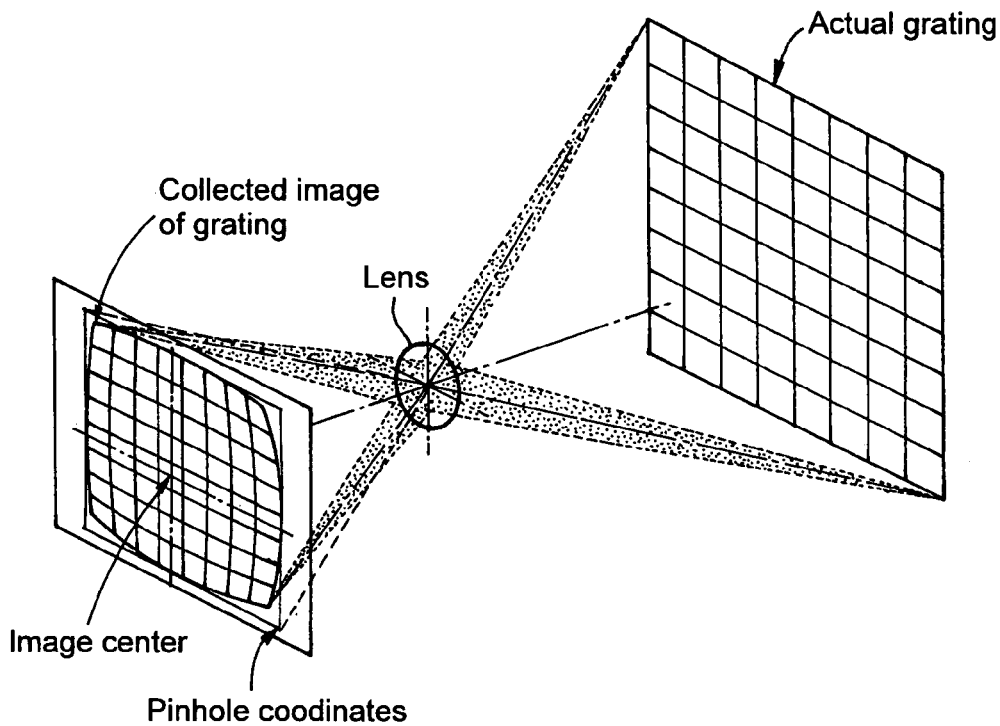
FIG. 20 is a perspective view illustrating the principle of correcting for distortion according to the present invention.

More specifically, since the projecting and imaging optical system have a distortion as shown in FIG. 20, a camera model equation is employed for the correction in consideration of the distortion.

An example of the camera model equation is shown below for determining the original pinhole coordinates ($x_{pin}$, $y_{pin}$) from the distortion coordinates ($u_{dist}$, $v_{dist}$) obtained by pre-collecting an image of a known grating pattern.

$$x_{dist}=(u_{dist}-u_0)/f_u, y_{dist}=(v_{dist}-v_0)/f_v \quad (5)$$

$$x_{pin}=x_{dist}+(g_1+g_3)x_{dist}^2+g_4 x_{dist}y_{dist}+g_1 y_{dist}^2+(k_1 r^2+k_2 r^4)x_{dist} \quad (6)$$

$$y_{pin}=x_{dist}+g_2 x_{dist}+g_3 x_{dist}y_{dist}+(g_2+g_4)y_{dist}^2+(k_1 r^2+k_2 r^4)y_{dist} \quad (7)$$

where $r^2=x_{dist}^2+y_{dist}^2$

On the other hand, to correct for distortion due to the projection lens, the distortion coordinates ($u_{dist}$, $v_{dist}$) are determined from the pinhole coordinates ($x_{pin}$, $y_{pin}$) through the convergence calculation using the Newton method. More specifically, this calculation is carried out as follows.

(1) Setting Initial Values $$(x_{dist}, y_{dist}) = (x_{pin}, y_{pin}) \qquad (8)$$

(2) Error Calculation

The distortion coordinates ($x_{dist}$, $y_{dist}$) are converted into the temperal pinhole coordinates ($x_{temp}$, $y_{temp}$) to calculate the error ($x_{err}$, $y_{err}$) between the pinhole coordinates ($x_{temp}$, $y_{temp}$) and the desired pinhole coordinates ($x_{pin}$, $y_{pin}$).

$$(x_{err}, y_{err}) = (x_{temp}, y_{temp}) - (x_{pin}, y_{pin}) \qquad (9)$$

(3) Calculation of the Amount of Correction $$(\partial x_{pin}/\partial x_{dist}) = 1 + 2(g_1 + g_3)x_{dist} + g_4 y_{dist} + k_1(3x_{dist}^2 + y_{dist}^2) + k_2(5x_{dist}^4 + 6x_{dist}^2 y_{dist}^2 + y_{dist}^4) \qquad (10)$$

$$(\partial x_{pin}/\partial y_{dist}) = g_4 x_{dist} + 2g_1 y_{dist} + 2k_1 x_{dist} y_{dist} + 4k_2 (x_{dist}^3 y_{dist} + x_{dist} y_{dist}^3) \qquad (11)$$

$$(\partial y_{pin}/\partial x_{dist}) = 2g_2 x_{dist} + g_3 y_{dist} + 2k_1 z_{dist} y_{dist} + 4k_2 (x_{dist}^3 y_{dist} + x_{dist} y_{dist}^3) \qquad (12)$$

$$(\partial y_{pin}/\partial y_{dist}) = 1 + g_3 x_{dist} + 2(g_2 + g_4)y_{dist} + k_1(x_{dist}^2 + 3y_{dist}^2) + k_2(x_{dist}^4 + 6x_{dist}^2 y_{dist}^2 + 5y_{dist}^4) \qquad (13)$$

$$(x_{diff}, y_{diff}) = \left( \frac{x_{err}}{\left(\frac{\partial x_{pin}}{\partial x_{dist}}\right)} + \frac{y_{err}}{\left(\frac{\partial y_{pin}}{\partial x_{dist}}\right)}, \frac{y_{err}}{\left(\frac{\partial y_{pin}}{\partial y_{dist}}\right)} + \frac{x_{err}}{\left(\frac{\partial x_{pin}}{\partial y_{dist}}\right)} \right) \qquad (14)$$

In the foregoing, since the second term is less significant, and to reduce the amount of calculation, the second term can be ignored to make a calculation as follows.

(4) Correction of Distortion Coordinates Values $$(x_{dist}, y_{dist}) = (x_{dist}, y_{dist}) - (x_{diff}, y_{diff}) \qquad (16)$$

(5) Determination of Convergence

For example, if ($x_{diff} < \epsilon$) and ($y_{diff} < \epsilon$), the convergence calculation is terminated. Otherwise, the process returns to (2) to correct the coordinates values.

In the equations above, $f_u$ and $f_v$ are the focal length (X-axis, Y-axis), $u_0$ and $v_0$ are the linear parameters indicative of the image center, $k_1$ and $k_2$ are the distortion coefficients in the radial direction, and $g_0$, $g_1$, $g_2$, and $g_3$ are the distortion parameters representative of the distortion coefficient in the orthogonal direction.

The experiments made by the inventor showed that with $\epsilon = 1\Delta e^{-8}$ in the aforementioned camera model, convergence occurs at an average of 1.5 times, on the order of 6 times at maximum.

More detailed reference can be made to the following articles on the correction for distortion.

Juyang Weng, "Camera Calibration with Distortion Models and Accuracy Evaluation" IEEE Trans. Patt. Anal. Maching Intell. Vol. 14, no. 4, pp 965-980

Zhengyou Zhang, "A Flexible New Technique for Camera Calibration" Dec. 2, 1998, MSR-TR-98-71

The convergence calculation is carried out using the Newton-Raphson method in steps 342 to 354 of FIG. 19 in order to eliminate the effect exerted by the non-linearity of the distortion.

The distortion in the lens optical system and the shift mechanism is corrected for in this manner, thereby allowing for providing enhanced measurement accuracy in the X and Y directions. Depending on the application, the distortion needs not to be corrected for.

Figure 21:
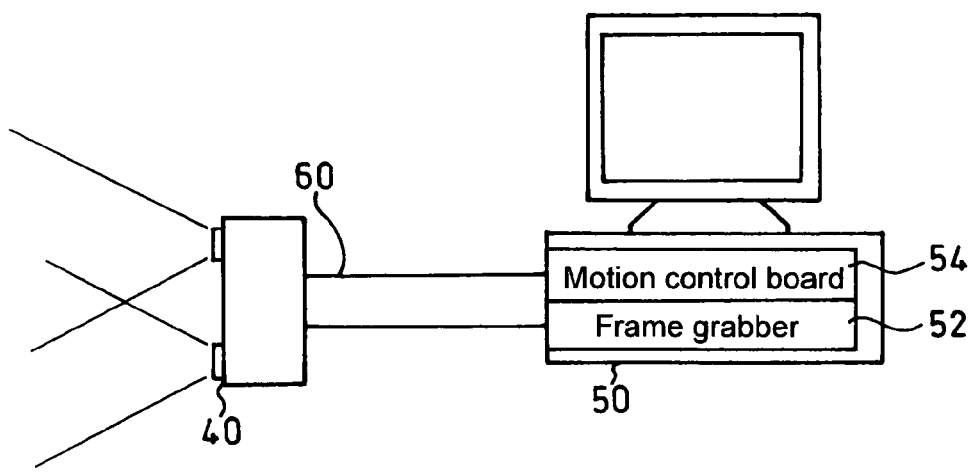
FIG. 21 is a view illustrating the system configuration of a specific embodiment.

FIG. 21 shows the system configuration of a specific embodiment.

This embodiment includes a measurement head 40 with a projecting portion for projecting a grating pattern and an imaging portion for collecting the image from a different line of view, a computer (PC) 50 for calculating a three-dimensional map from the data on the image collected, and cables 60 for connecting therebetween.

Figure 22:
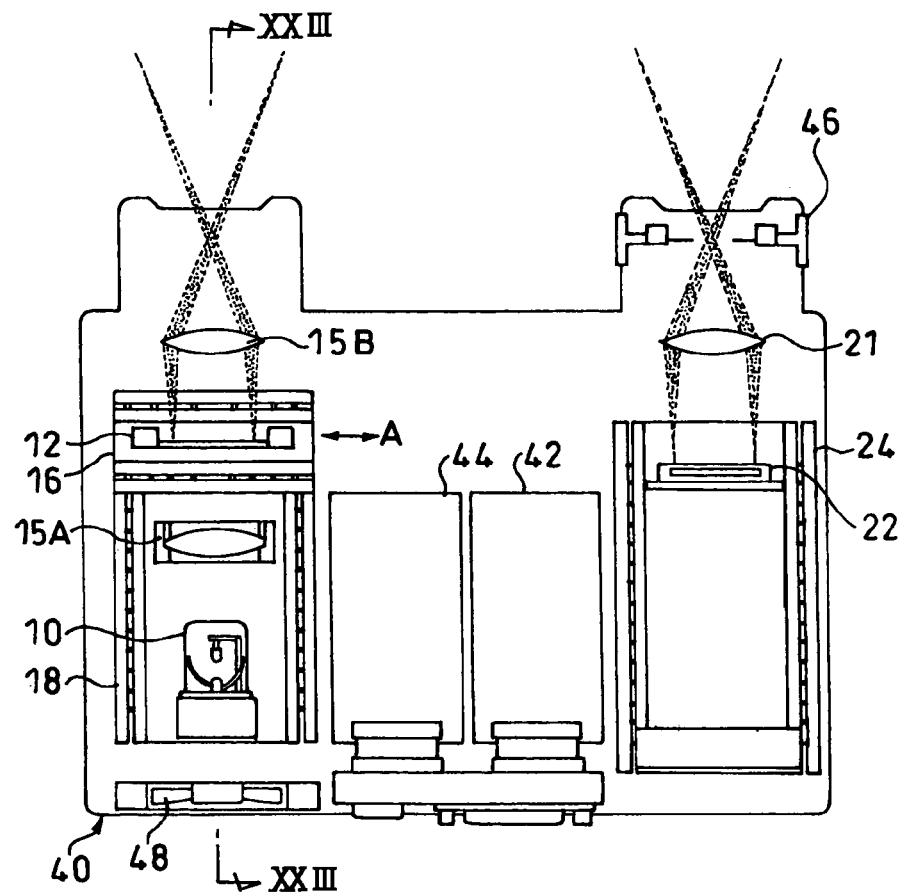
FIG. 22 is a sectional view illustrating the configuration of a measurement head employed in the embodiment.
Figure 23:
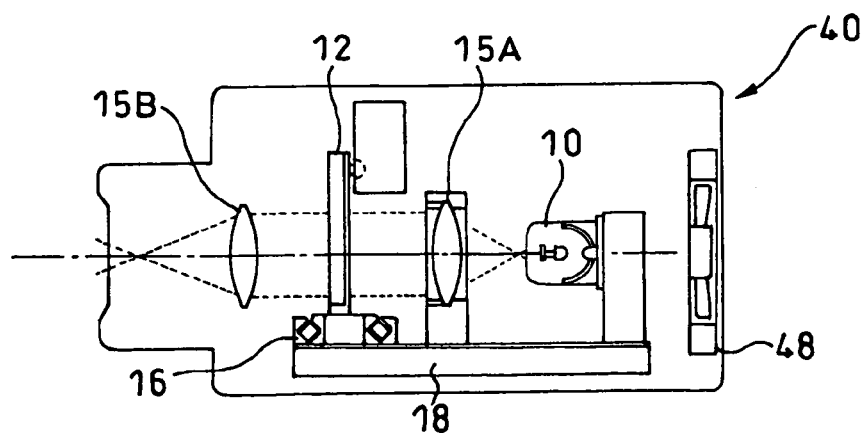
FIG. 23 is a cross-sectional view taken along line XXIII-XXIII of FIG. 22.

More specifically, as shown in FIG. 22 (a sectional view viewed from above) and FIG. 23 (a cross-sectional view taken along line XXIII-XXIII of FIG. 22), the measurement head 40 includes the grating shift mechanism 16 for moving the grating filter 12 at a constant speed, the illumination lamp 10 for projecting a grating pattern, the imaging device (camera) 22 for collecting an image of a projected grating pattern, the first focus shift mechanism 18 for moving the focus of the projecting optical system at a constant speed, and the second focus shift mechanism 24 for moving the focus of the imaging optical system at a constant speed. The measurement head 40 further includes the projection lens 15B having an image side telecentric optical system and the imaging lens 21 to prevent an imaging point of a work captured by a pixel from changing even when a focus shift occurs. The measurement head 40 also includes a camera control board 42 for detecting the amount of shift of the grating filter 12 to generate an image collection timing signal for output to the camera 22, a control circuit (not shown) for synchronously moving the drive units of the grating shift mechanism 16 and the focus shift mechanisms 18, 24, and a projector control board 44 for turning on the illumination lamp 10 upon collecting images. In FIGS. 22 and 23, illustrated are a manual aperture 46, for example, and a cooling fan 48.

In this arrangement, the projecting optical system (15) and the imaging optical system (21) are provided as an image side telecentric optical system to prevent an imaging point on the measured work 8 captured by a pixel from changing even when a focus shift occurs.

The computer 50 includes a frame grabber 52 for capturing an input image from the imaging device 22 of the measurement head 40, and a motion control board 54 for controlling the shift mechanisms 16, 18, 24 of the measurement head 40. The computer 50 also includes software (not shown) for controlling the measurement head 40, the software having the function of entering a sequence of images while shifting the focus and the phase at the same time to transfer the images to the main memory of the computer 50, the function of displaying online an image corresponding to the measurement range of the measurement head 40, and the function of setting the range of measurement depth. The computer 50 further includes software (not shown) for preparing a three-dimensional map, the software having the function of calculating the focal center from a intensity waveform having a varying amplitude resulting from a focus shift, the function of calculating the phase of a intensity waveform near the focal center, the function of unwrapping the phase using the focal center data, the function of correcting the coordinates on an image considering the distortion of the optical system, the function of determining the point of intersection of the epipolar line starting from a pixel in the imaging device 22 and a grating plane of the projected grating pattern to calculate the three-dimensional position of the pattern projected onto a pixel, the function of reproducing the sequence of entered images to check for the image data having been properly entered, the function of displaying the three-dimensional map prepared, and the function of storing data on a group of points of the three-dimensional map in the CAD format such as IGES.

Figure 24:
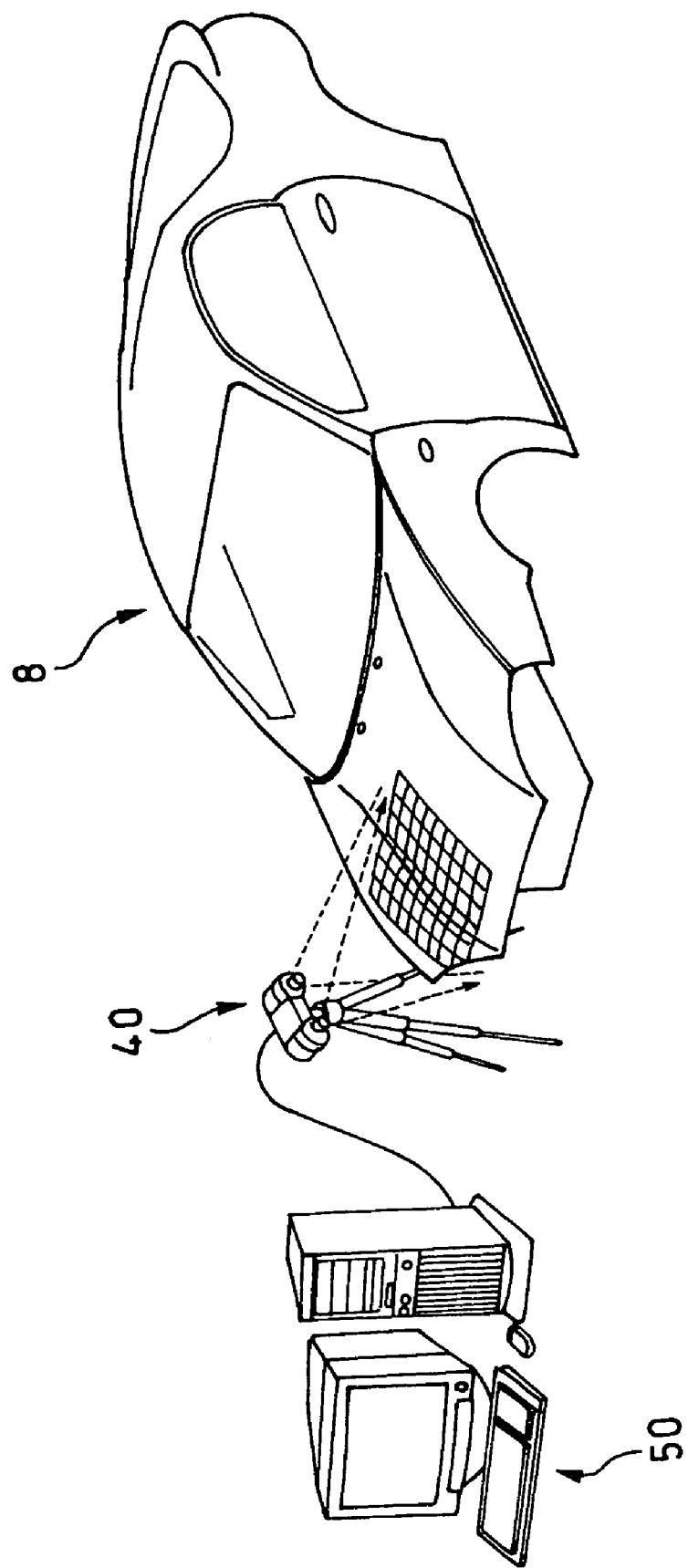
FIG. 24 is a perspective view illustrating the measurement made in the embodiment.

FIG. 24 shows how this embodiment is actually implemented in measuring a measured work (e.g., a car in this embodiment) 8.

Figure 25:
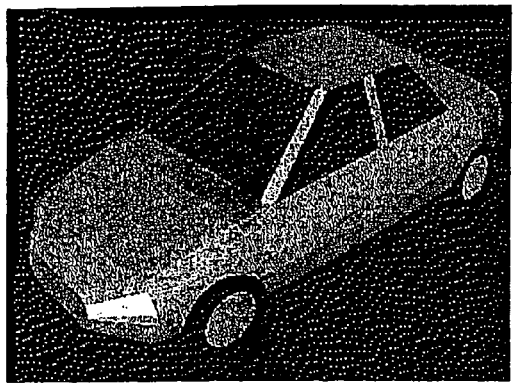
FIG. 25 is a view illustrating a work being measured.
Figure 26:
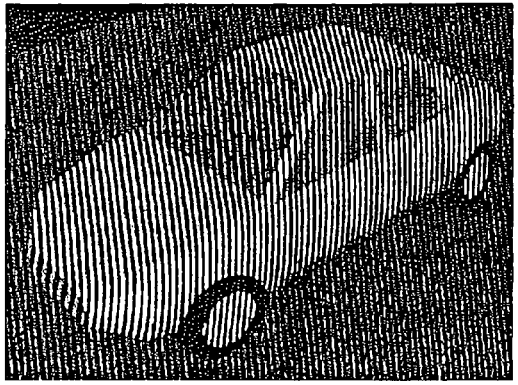
FIG. 26 is a view illustrating an image formed by projecting a grating using a pinhole optical system having an infinite depth of focus.
Figure 27:
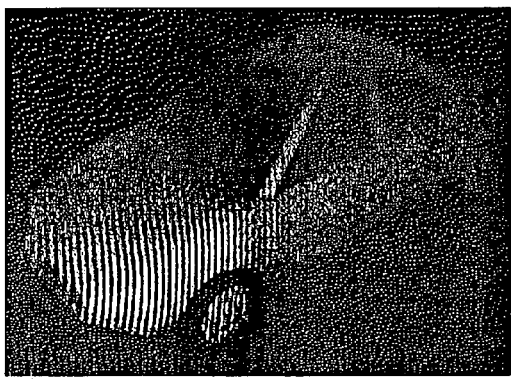
FIG. 27 is a view illustrating an image formed by projecting a grating using an actual optical system.
Figure 27:
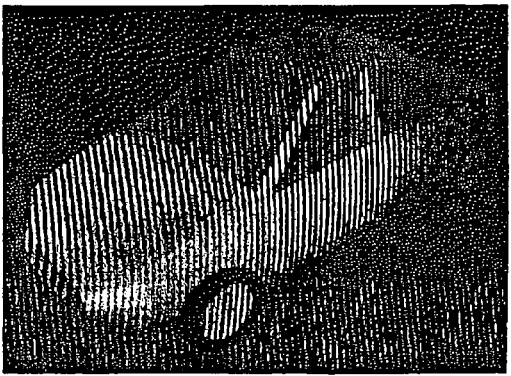
Figure 27:
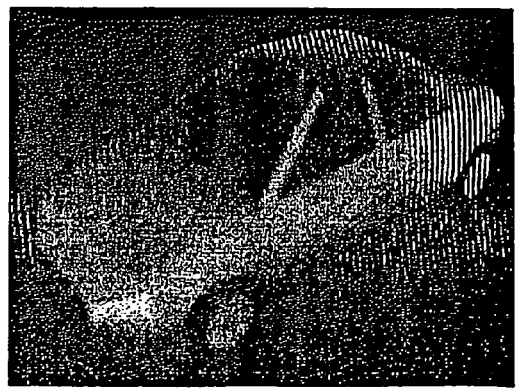
Figure 32:
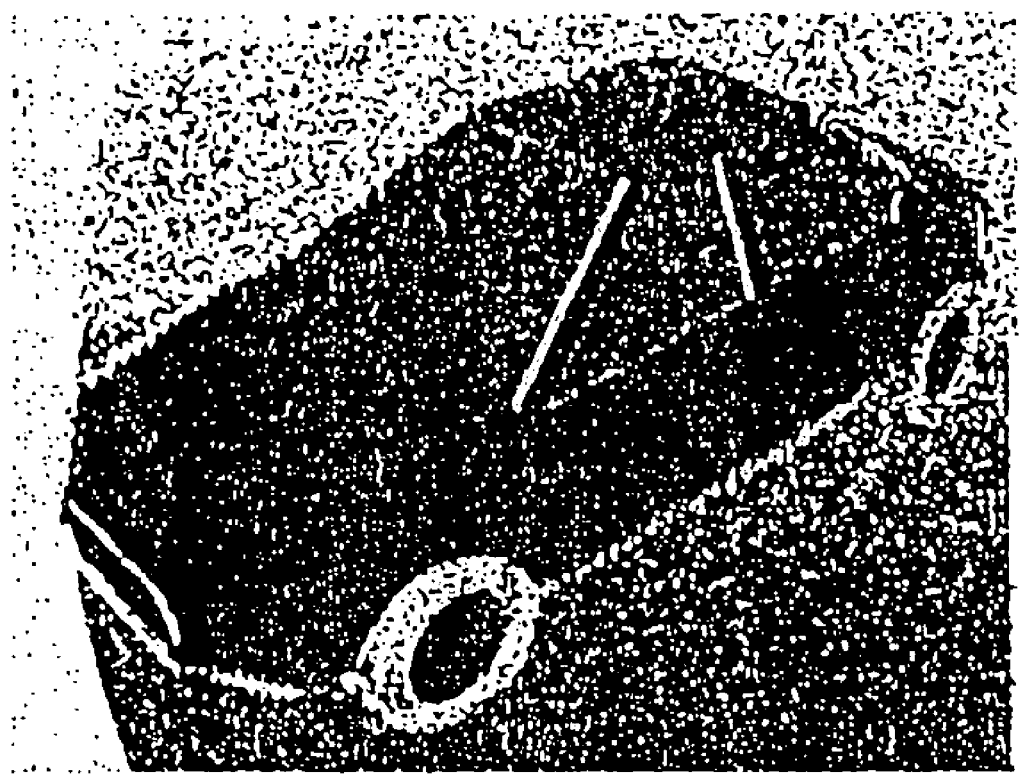
FIG. 32 is a view illustrating an example of an error distribution image in a step of preparing a three-dimensional map.

Now, an explanation is given to an example in which the projection side and the imaging side are spaced apart by 500 mm from each other to collect 128 images. In this example, widening the spacing causes the interval between fringe orders to be reduced, resulting in an increase in resolution. Suppose that the measured work 8 is a full-size car having a shape as shown in FIG. 25, with a measurement range of 4000 mm in the X direction by 3000 mm in the Y direction by 2000 mm in the Z direction, a distance of 4800 mm to the center of the work, and an image size of 320 by 240 pixels. In this case, as shown in FIG. 26, using a pinhole optical system having an infinite depth of focus allows the grating pattern to be projected and imaged clearly from the front to the rear side. On the other hand, as shown in FIG. 27, an actual optical system having a finite depth of focus limits the range of grating pattern projection depending on the position of focus.

Now, the steps of preparing a three-dimensional map are shown in FIGS. 28 to 31. Suppose that a three-dimensional map determined only from a focal center image is as shown in FIG. 28(a) when expressed with a full-scale depth and as shown in FIG. 28(b) when expressed with a 200 mm interval depth. In this case, the phase image is as shown in FIG. 29 and the unwrap phase image is as shown in FIG. 30. The three-dimensional map image finally obtained is as shown in FIG. 31(a) with a full-scale depth and as shown in FIG. 31(b) when expressed with a 200 mm interval depth. Although not clearly shown in the figures, particularly for the expression with a 200 mm interval depth, FIG. 31(b) clearly shows a smoother shape than FIG. 28(b).

FIG. 30 shows error in data obtained through a measurement using an additional noise component which is presumably found in an actual car. In this case, since no light is reflected from the tires, the noise causes a measurement with low accuracy; however, other parts provide a measurement result with high accuracy.

The aforementioned embodiment employs a car to be measured; however, the type of measured works is not limited thereto. Additionally, the source of light is not limited to the xenon flash lamp or a halogen lamp.

Now, an embodiment for use with an image measurement apparatus will be explained below. The embodiment can be implemented either by (1) using an imaging optical system (measuring optical system) of the image measurement apparatus without making any change thereto but with an additional projecting optical system, or (2) not using the imaging optical system of the image measurement apparatus but, as shown in FIG. 33, attaching the measurement head 40 incorporating an imaging optical system and a projecting optical system to the Z-axis of the image measurement apparatus in parallel to the imaging optical system of the image measurement apparatus, allowing the Z-axis of the image measurement apparatus to be driven to shift the grating and the focus.

Figure 33:
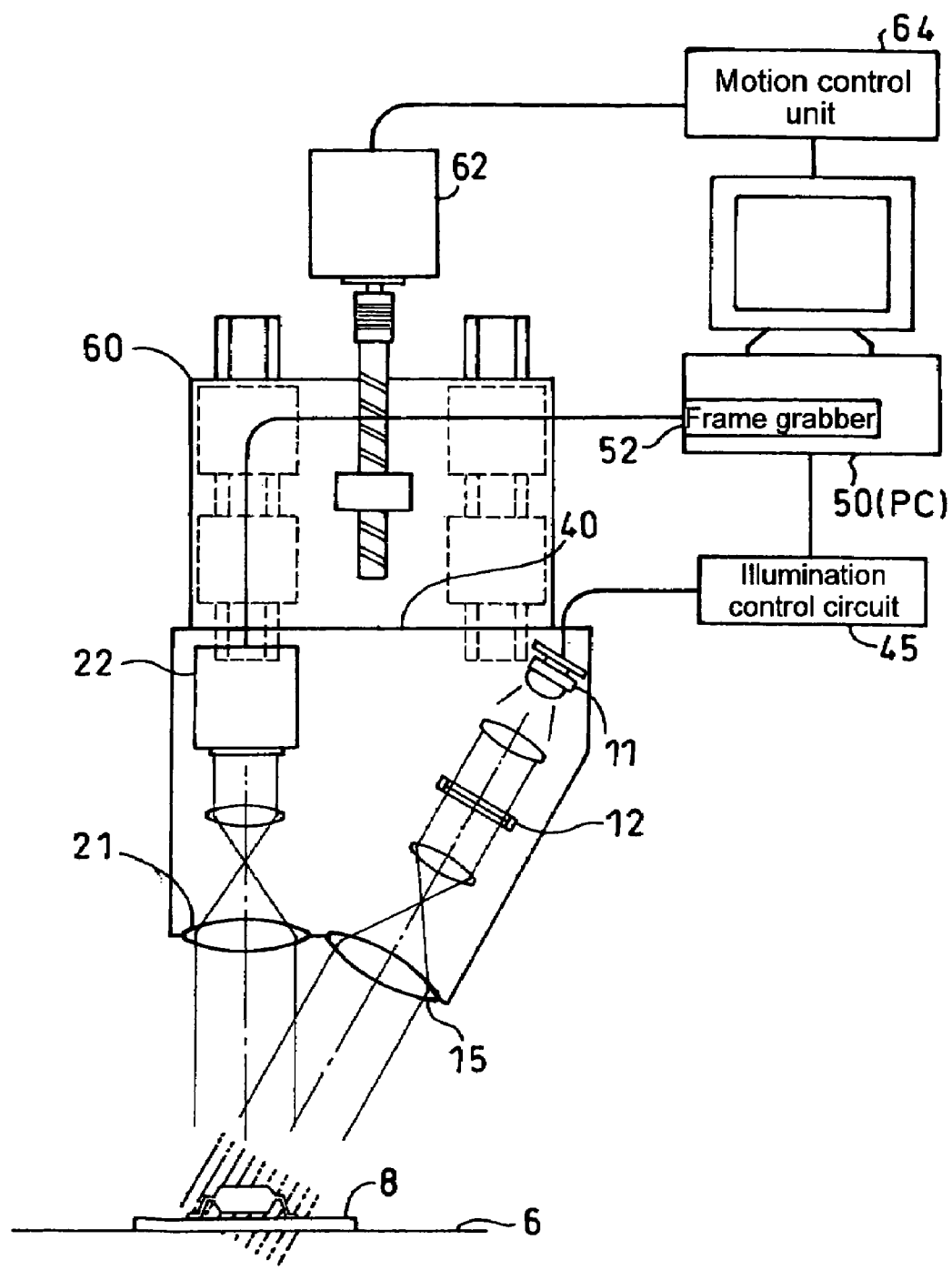
FIG. 33 is a view illustrating the configuration of the embodiment incorporated into an image measurement system.

In the embodiment of FIG. 33, the grating shift mechanism and the focus shift mechanism can be replaced by a Z-axis oriented guide mechanism 60. To shift the focus, the measurement head 40 itself moves up and down in the Z-axis direction as the current image measurement apparatus does. Since grating patterns are projected diagonally, the measurement head 40 moving up and down allows a grating pattern projected onto the measured work 8 to move, causing a phase shift in the grating pattern. The angle of the projecting optical system or the spacing of the grating is adjusted to set the focus and phase shift speeds.

In the figure, the apparatus includes a stage 6 on which the measured work 8 is placed, a light-emitting device 11, a projection lens 15 and an imaging lens 21 which have a telecentric structure on both sides, an illumination control circuit 45, a Z-axis guide mechanism feed motor 62, and a motion control unit 64 for controlling the feed motor 62.

For the method according to (2), the embodiment can be incorporated not only into the image measurement apparatus but also into a three-dimensional measurement apparatus (of a type having a Z-axis capable of being driven by a motor at a constant speed). In either case, since the grating pattern is projected diagonally, movement may be made only in the Z-axis direction.

Both the grating and focus shift mechanisms are adapted to move at a constant speed in the aforementioned embodiment; however, the mechanisms may not have to move at a constant speed so long as the shift position can be known.

Although certain preferred embodiments have been shown and described, it should be understood that many changes and modifications may be made therein without departing from the scope of the appended claims.

The disclosure of Japanese Patent Application No. 2003-96712 filed Mar. 31, 2003 including specification, drawings and claims is incorporated herein by reference in its entirety.

What is claimed is:

1. A non-contact three-dimensional surface measurement method comprising the steps of:
    observing a grating pattern projected onto an object being measured, while a phase of the pattern is being shifted, in a different direction from a projection direction;
    analyzing contrast of a grating image deformed in accordance with a shape of the object and thereby obtaining the shape thereof;
    shifting focuses of the projection and imaging sides back and forth continuously, by altering a position of a grating filter and an imagine device with respect to a projection lens and an imaging lens, respectively, to enlarge a measurement range in a direction of depth;
    successively entering image data of the object while the focus and the phase are being shifted at a constant speed; and
    preparing a three-dimensional map by processing the entered data in a computer, by determining an order of a fringe from a focal center and unwrapping the phase to calculate an absolute value of the phase, and calculating a three-dimensional position of a point of intersection of a grating plane of the fringe order and an epipolar line of an imaging point.

2. The non-contact three-dimensional surface measurement method according to claim 1, wherein the step of preparing the three-dimensional map further comprises the steps of:
    extracting a intensity waveform at image coordinates;
    eliminating an offset component and a fluctuating component of the intensity waveform;
    calculating a focal center; and
    calculating a phase of the focal center.

3. The non-contact three-dimensional surface measurement method according to claim 2, wherein the step of eliminating the offset component and the fluctuating component of the intensity waveform is carried out to calculate a differential waveform of the intensity waveform.

4. The non-contact three-dimensional surface measurement method according to claim 2, wherein the step of eliminating the offset component and the fluctuating component of the intensity waveform is carried out by averaging intensity value in the vicinities plus or minus $\pi$ at one phase shift value of the intensity waveform.

5. The non-contact three-dimensional surface measurement method according to claim 2, wherein the step of calculating the focal center is carried out such that a frequency average for each of squared waveforms of curves indicative of every n-th variations in intensity is determined being weighted corresponding to a height of a crest of an extracted waveform.

6. The non-contact three-dimensional surface measurement method according to claim 2, wherein the step of calculating the phase of the focal center is carried out to determine the phase through multiplication by a mother waveform and by Fourier integration.

7. A non-contact three-dimensional surface measurement apparatus in which a grating pattern projected onto an object being measured, while a phase of the pattern is being shifted, is observed in a direction different from a projection direction to analyze contrast of a grating image deformed in accordance with a shape of the object being measured and thereby obtaining the shape thereof, the apparatus comprising:

means for projecting a grating pattern onto the object being measured while shifting a focus back and forth continuously, by altering a position of a grating filter with respect to a projection lens, and shifting a phase:

means for entering image data of the pattern projected onto the object being measured while the focus is being shifted back and forth continuously, by altering a position of an imaging device with respect to an imaging lens; and means for preparing a three-dimensional map by processing the image data entered, wherein the means for preparing the three-dimensional map further comprises:

means for determining an order of a fringe from a focal center and unwrapping the phase to calculate an absolute value of the phase, and means for calculating a three-dimensional position of a point of intersection of a grating plane of the grating order and an epipolar line of an imaging point.

8. A non-contact three-dimensional surface measurement apparatus in which a grating pattern projected onto an object being measured, while a phase of the pattern is being shifted, is observed in a direction different from a projection direction to analyze contrast of a grating image deformed in accordance with a shape of the object being measured and thereby obtaining the shape thereof, the apparatus comprising:

means for projecting a grating pattern onto the object being measured while shifting a focus back and forth continuously, by altering a position of a grating filter with respect to a projection lens, and shifting a phase;

means for entering image data of the pattern projected onto the object being measured while the focus is being shifted back and forth continuously, by altering a position of an imaging device with respect to an imaging lens; and means for preparing a three-dimensional map by processing the image data entered, wherein the means for preparing the three-dimensional map comprises a computer, the computer comprising:

a frame grabber for capturing an input image from an imaging device of a measurement head, a motion control board for controlling a shift mechanism of the measurement head, software for controlling the measurement head, the software having a function of entering a sequence of images while shifting a focus and a phase at the same time to transfer the images to a main memory of the computer, a function of displaying online an image corresponding to a measurement range of the measurement head, and a function of setting a range of a measurement depth, and software for preparing the three-dimensional map, the software having a function of calculating a focal center from a intensity waveform having a varying amplitude resulting from a focus shift, a function of calculating a phase of the intensity waveform near the focal center, a function of unwrapping the phase using focal center data, a function of correcting coordinates on an image considering distortion of an optical system, a function of determining a point of intersection of an epipolar line starting from a pixel in the imaging device and a grating plane of a projected grating pattern to calculate a three-dimensional position of the pattern projected onto a pixel, a function of reproducing the sequence of entered images to check for the image data having been properly entered, a function of displaying the three-dimensional map prepared, and a function of storing data on a group of points of the three-dimensional map in a CAD format.

* * * * *